United States Patent
Krishnamurthy et al.

(10) Patent No.: US 9,247,506 B2
(45) Date of Patent: Jan. 26, 2016

(54) METHOD AND APPARATUS FOR MULTI-RADIO COEXISTENCE ON ADJACENT FREQUENCY BANDS

(71) Applicant: Google Technology Holdings LLC, Mountain View, CA (US)

(72) Inventors: Sandeep H Krishnamurthy, Arlington Heights, IL (US); Robert T Love, Barrington, IL (US); Ajit Nimbalker, Buffalo Grove, IL (US); Ravikiran Nory, Buffalo Grove, IL (US); Kenneth A Stewart, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/211,903

(22) Filed: Mar. 14, 2014

(65) Prior Publication Data
US 2014/0198765 A1    Jul. 17, 2014

Related U.S. Application Data

(62) Division of application No. 13/083,105, filed on Apr. 8, 2011, now Pat. No. 8,724,492.

(51) Int. Cl.
*H04W 52/52* (2009.01)
*H04W 52/24* (2009.01)
(Continued)

(52) U.S. Cl.
CPC ........... *H04W 52/243* (2013.01); *H04L 5/0035* (2013.01); *H04L 5/0062* (2013.01);
(Continued)

(58) Field of Classification Search
CPC .............................. H04W 74/00; H04W 4/023
USPC ................................................. 370/330, 252
See application file for complete search history.

(56) References Cited

U.S. PATENT DOCUMENTS 5,841,214 A    11/1998   Schmidt et al.
6,377,809 B1 *  4/2002   Rezaiifar et al. ............. 455/455
(Continued)

FOREIGN PATENT DOCUMENTS

EP    1067705 B1    8/2009
WO   0189102 A1    11/2001
(Continued)

OTHER PUBLICATIONS

Harold Kinley, "Transmitter Noise/Receiver Desense Primer", Urgent Communications, http://urgentcomm.com/mag/radio_transmitter_noisereceiver_desense, Sep. 1, 2000, 3 pages.
(Continued)

*Primary Examiner* — Man Phan
*Assistant Examiner* — Mewale Ambaye
(74) *Attorney, Agent, or Firm* — Faegre Baker Daniels LLP

(57) ABSTRACT

Various methods for controlling an aggressor user equipment (UE) can use two transmission power control loops to mitigate UE-to-UE adjacent carrier frequency band interference to a geographically proximal victim UE. The aggressor UE can select between different transmission power parameters based on two (or more) power values. The usage of any particular power value depends on the time period of the transmission. For example, if a proximal victim UE is scheduled to receive when the aggressor UE is scheduled to transmit, a lower power value may be selected as instructed by a co-scheduler or determined by the aggressor UE. The aggressor UE can also send dual power headroom reports to its serving base station based on the two power values.

23 Claims, 15 Drawing Sheets

(51) Int. Cl.

| | |
|---|---|
| *H04L 5/00* | (2006.01) |
| *H04L 5/14* | (2006.01) |
| *H04W 72/12* | (2009.01) |
| *H04W 72/04* | (2009.01) |
| *H04W 74/00* | (2009.01) |
| *H04W 52/10* | (2009.01) |
| *H04W 52/16* | (2009.01) |
| *H04W 52/36* | (2009.01) |
| *H04W 72/02* | (2009.01) |
| *H04W 4/02* | (2009.01) |
| *H04W 92/20* | (2009.01) |

(52) U.S. Cl.
CPC .............. *H04L 5/143* (2013.01); *H04W 52/10* (2013.01); *H04W 52/16* (2013.01); *H04W 52/365* (2013.01); *H04W 72/02* (2013.01); *H04W 72/048* (2013.01); *H04W 72/1268* (2013.01); *H04W 74/00* (2013.01); *H04W 4/023* (2013.01); *H04W 92/20* (2013.01); *Y02B 60/50* (2013.01)

(56) References Cited

U.S. PATENT DOCUMENTS

| | | |
|---|---|---|
| 6,917,787 B2 | 7/2005 | Devaney, II et al. |
| 7,043,208 B2 | 5/2006 | Nigra |
| 7,706,752 B2 | 4/2010 | Han et al. |
| 2002/0012381 A1 | 1/2002 | Mattison et al. |
| 2003/0045333 A1 | 3/2003 | Kimata et al. |
| 2003/0100278 A1 | 5/2003 | Devaney et al. |
| 2003/0228892 A1 | 12/2003 | Maalismaa et al. |
| 2004/0053620 A1 | 3/2004 | Garrison et al. |
| 2004/0077353 A1 | 4/2004 | Mahany |
| 2004/0266342 A1 | 12/2004 | Kontola et al. |
| 2007/0167191 A1 | 7/2007 | Carlsson |
| 2009/0082064 A1 | 3/2009 | Li et al. |
| 2009/0170542 A1 | 7/2009 | Chen et al. |
| 2009/0298522 A1 | 12/2009 | Chaudhri et al. |
| 2010/0035562 A1 | 2/2010 | Alberth, Jr. et al. |
| 2010/0067469 A1 | 3/2010 | Gaal et al. |
| 2010/0124880 A1 | 5/2010 | Wu et al. |
| 2010/0197235 A1 | 8/2010 | Wilhelmsson |
| 2010/0216473 A1 | 8/2010 | Kazmi et al. |
| 2010/0235540 A1 | 9/2010 | Korhonen et al. |
| 2010/0273515 A1* | 10/2010 | Fabien et al. .................. 455/509 |
| 2010/0304685 A1* | 12/2010 | Wietfeldt et al. .......... 455/67.11 |
| 2010/0317339 A1 | 12/2010 | Koc |
| 2010/0322287 A1 | 12/2010 | Truong et al. |

FOREIGN PATENT DOCUMENTS

| | | |
|---|---|---|
| WO | 2004001993 A1 | 12/2003 |
| WO | 2006128948 A1 | 12/2006 |
| WO | 2007096683 A1 | 8/2007 |

OTHER PUBLICATIONS

C. Gessner, "UMTS Long Term Evolutions (LTE) Technology Introduction", Application Note 1MA111, Rohde & Schwartz Products, Sep. 2008, pp. 1-55.

Andreas Roessler and Guenter Pfeifer, "LTE UE RF Measurements—An Introduction and Overview", Rohde & Schwartz Products, Feb. 2010, pp. 1-28, Germany.

Lynne Patterson, "Conducting Measurements on LTE Transmitters", http://www.evaluationengineering.com/index.php/solutions/communications-test/conducting-measurements-on-lte-transmitters.html, Feb. 2009, pp. 1-5.

R1-070757 Motorola, "LTE UE Minimum Transmission Bandwidth" R1-070757, 3GPP TSG RAN WG1 Meeting #48, Feb. 12-16, 2007, pp. 1-5.

3GPP TS 36.213, "3rd Generation Partnership Project; Technical Specification Group Radio Access Network; Evolved Universal Terrestrial Radio Access (E-UTRA); Physical Layer Procedures (Release 9)", 3GPP TS 36.213 V9.3.0, Sep. 2010, pp. 1-80, France.

Om Malik, 700 MHz Explained in 10 Steps, Mar. 14, 2007, http://gigaom.com/2007/03/14/700,hz-explained/, Giga Omni Media, Inc.

Claude Desset et al., WiMAX Downlink OFDMA Burst Placement for Optimized Receiver Duty-Cycling, IEEE Communications Society ICC 2007 Proceedings, pp. 5149-5154.

European Patent Office, Extended European Search Report for European Patent Application No. 14169694.8 (related to above-captioned patent application), mailed Jan. 14, 2015.

European Patent Office, International Search Report and Written Opinion for PCT Application No. PCT/2012/029615 (related to above-captioned patent application), mailed Jul. 10, 2012.

United States Patent and Trademark Office, Examiner's Answer to Appeal Brief for U.S. Appl. No. 12/186,276 (related to above-captioned patent application), mailed Nov. 6, 2012.

* cited by examiner

METHOD AND APPARATUS FOR MULTI-RADIO COEXISTENCE ON ADJACENT FREQUENCY BANDS

CROSS REFERENCE TO RELATED APPLICATIONS

This application is a divisional of U.S. patent application Ser. No. 13/083,105 entitled "Method and Apparatus for Multi-Radio Coexistence on Adjacent Frequency Bands" filed on Apr. 8, 2011 by Colin D. Frank et al. and claims the benefit thereof.

FIELD OF THE DISCLOSURE

This disclosure relates generally to improving coexistence among radios operating in adjacent frequency spectrum or bands. These radios may be collocated (i.e., within a single device) or non-collocated (i.e., not within a single device).

BACKGROUND OF THE DISCLOSURE

Coexistence refers to the ability for multiple wireless protocols to operate in or around the same or adjacent time-frequency radio resources without significant degradation to any radio's operation due to interference. Note that interference may occur at a reception radio frequency or at any intermediate frequency used within a receiving device for the purpose of demodulation. Without coexistence mechanisms, radio frequency interference can cause, amongst other degradations, loss of connectivity, decreased data throughput or reduction in quality of service, or increased current drain.

When adjacent radio frequency bands are allocated to different uses, wireless interference can result. In general, there is an elevated risk of wireless interference when a frequency band used for uplink transmissions is adjacent to a frequency band used for downlink transmissions; the wireless transmissions in one band can create interference for wireless receivers operating in the adjacent band.

For example, a user equipment (UE) transmitting at 704-716 MHz (e.g., the United States Federal Communication Commission Lower 700 MHz band, B and C blocks) can interfere with nearby or collocated user equipment receiving at 716-728 MHz (e.g., the United States Federal Communication Commission Lower 700 MHz band, D and E blocks). As another example, a base station (eNB) transmitting at 734-746 MHz (e.g., the United States Federal Communication Commission Lower 700 MHz band, B and C blocks) can interfere with a nearby or co-sited base station receiving at 716-728 MHz (e.g., the United States Federal Communication Commission Lower 700 MHz band, D and E blocks).

The United States (US) Federal Communication Commission (FCC) established common emission spectrum limits and common field strength limits for this entire section of spectrum (i.e., 698-746 MHz). Given these limits, a common method applied to alleviate interference is to introduce a "null" or "guard" frequency band between deployed bands that are sufficient to reduce or avoid interference. However, there is very little guard (nominally zero) band between the US FCC Lower 700 MHz C block (710-716 MHz) and its adjacent Lower 700 MHz D block (716-722 MHz).

As guard bands narrow, improved filtering and/or physical separation of transmit and receive antennas is commonly used to reduce interference caused by adjacent channel leakage (such as harmonics, intermodulation components, parasitic emissions, frequency conversion spurious emissions, etc.). Although this is feasible at base stations, improved filtering and antenna separation may be difficult or prohibitively expensive to implement in user equipment where physical constraints (such as small dimensions which result in low coupling losses between transmitting and receiving antennas) and low cost targets apply. Because multiple radios can wirelessly interfere with each other in various ways, and effective filtering may not be available at a reasonable cost, coexistence mechanisms should be developed for a variety of collocated and non-collocated scenarios.

With the continuing emergence of a variety of wireless communication technologies operating in adjacent frequencies, there is an opportunity to provide more effective solutions to mitigate interference and coexistence problems among collocated and non-collocated radios. The various aspects, features and advantages of the disclosure will become more fully apparent to those having ordinary skill in the art upon careful consideration of the following Drawings and accompanying Detailed Description.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
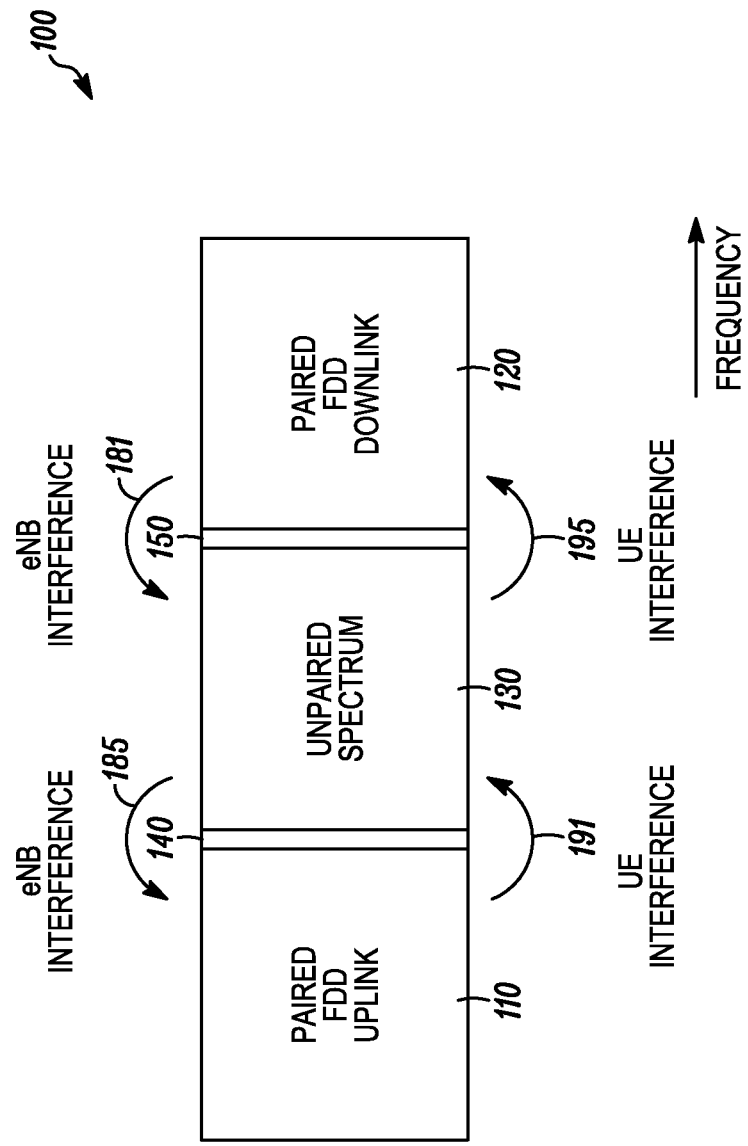
FIG. 1 shows an example of a spectrum allocation diagram with three adjacent frequency bands.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments. Also, flowchart boxes may be rearranged into different sequential orders, repeated, or skipped in certain instances.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

A wide variety of mechanisms can result in adjacent carrier system interference. Implementation of a method and apparatus for multi-radio coexistence allows a co-scheduler to arrange uplink and downlink subcarrier, subframe, and power assignments in adjacent carrier systems to mitigate interference by reducing the assignment of radio resources or transmission power on radio resources of proximal UEs on different networks that are projected to overlap in time and adjacent frequency. The different networks may also use different radio access technologies (RATs) such as LTE and HSPA, or LTE and GSM. The co-scheduler may specifically assign radio resources to each UE to reduce interference in a complete subframe or only a portion of a subframe. The co-scheduler may specifically attempt to reduce interference on a Physical Downlink Control Channel (PDCCH). The co-scheduler may specifically attempt to reduce interference during a proximal UE's channel measurement time period.

A wireless terminal may help mitigate adjacent carrier system interference by complying with transmission instructions from its serving base station and also by adjusting its transmission power to reduce adjacent carrier system interference when another wireless terminal is nearby and scheduled to receive transmissions from its serving base station on an adjacent frequency band or scheduled to make channel measurements.

Note that in what follows, the concept of an "adjacent band" is one where first and second bands (or the frequency portion of time-frequency radio resources) are fully adjacent or partially adjacent. Here, fully adjacent means that the first and second frequency bands are disjoint while partially adjacent means that the first and second frequency bands may have common frequency elements. Also the concept of "proximal" is limited to spatial (geographic) proximity and does not include closeness in time or frequency.

FIG. 1 shows an example of a spectrum allocation diagram 100 with three adjacent frequency bands 110, 120, 130. A "frequency band" refers to the designated frequency spectrum portion that a particular transmitter, operating using a particular radio access technology (RAT), is permitted use. Generally, a frequency band is defined by a governmental entity such as the US FCC. Occasionally, this concept is referred to as a "transmission bandwidth configuration" in LTE literature. In some wireless systems, such as LTE, transmission uses at least one subcarrier within a frequency band. The allocated transmission sub-carrier(s) may change over time and frequency.

In this example, paired frequency bands 110, 120 are deployed as 3GPP Long Term Evolution (LTE) frequency division duplex (FDD) uplink frequencies and downlink frequencies. Thus, for frequencies within the FDD uplink band 110, mobile stations are transmitting and base stations are receiving. Meanwhile, for frequencies within the FDD downlink band 120, base stations are transmitting and mobile stations are receiving. Note that a mobile station is sometimes called user equipment (UE) or a wireless terminal, among other things. Also, a base station is often called an evolved Node B (eNB), or occasionally a network access point (AP), and may also be referred to as a femtocell, picocell, or radio remote head.

In this example, an unpaired frequency band 130 is both adjacent to the upper edge of the FDD uplink band 110 and adjacent to the lower edge of the FDD downlink band 120. Note that the x-axis indicates frequency. Depending on how it is deployed, this unpaired spectrum can be used for uplink transmissions, downlink transmissions, or both uplink and downlink transmissions (at different times). Alternately, this frequency band 130 can be one part (either downlink or uplink) of a set of paired FDD frequency bands.

A base station's transmissions in one frequency band may cause receiver desensitization (desense) at co-sited or nearby base stations that are tuned to receive signals in an adjacent band, especially if an antenna system of the second base station's receiver is directed toward the first base station's transmitting antenna system. For example, if a first base station (eNB) is transmitting on the FDD downlink 120 (most notably but not necessarily exclusively) near the lower-frequency edge, it may interfere 181 with a second base station receiving on the unpaired band 130 near the upper-frequency edge. As another example, if the second base station transmits on the unpaired band 130 (most notably but not necessarily exclusively) near the lower-frequency edge, it may interfere 185 with another base station (e.g., the first base station) receiving near the upper-frequency edge of the FDD uplink band 110. Note that an interfering eNB (also called an aggressor eNB) may be co-sited with an interfered-with eNB (also called a victim eNB), or the aggressor eNB and the victim eNB may be in nearby (but not co-sited) locations.

Adjacent band interference can also cause receiver desense in a mobile environment as well as a base station environment. When user equipment (UE) is transmitting on the FDD uplink 110 near the upper-frequency edge, it may interfere 191 with a UE receiver operating in the unpaired band 130 near the lower-frequency edge. Similarly, a UE transmitting in the unpaired spectrum 130 at the upper-frequency edge can cause interference 195 with a UE receiving in the FDD downlink band 120 at the lower-frequency edge. Note that an interfering UE (also called an aggressor UE) may be collocated with an interfered-with UE (also called a victim UE). In other words, the aggressor UE and the victim UE may be subsumed into a single device operating on both the system of the paired bands and the system of the unpaired band and thus result in self-interference. Alternately, the aggressor UE and the victim UE may be in nearby (non-collocated) devices. When the aggressor UE and the victim UE are in separate mobile devices, movement of the devices (one, the other, or both) may increase or reduce interference simply because the transmitters and receivers are physically closer or farther away from each other, or the transmitting and receiving antenna systems are directed toward or away from each other.

Note that mobile devices may also enter into direct or peer-to-peer transmission modes where the concepts of "uplink" and "downlink" operation effectively become those of transmission from a first device to a second device, and a second device to a first device. Note also that the first and second transmissions may occur in precisely the same frequency band (such as in a time-division duplex or TDD system) or in substantially overlapping frequency bands. Finally, one or more of the interfering transmission or reception activities may include the act of broadcast or simulcast operation, where multiple devices receive a common transmission. All of these scenarios are applicable to the present disclosure.

Note that the degree of separation 140, 150 between adjacent bands may vary. FIG. 1 shows very little separation between the three bands 110, 120, 130. Greater separation (i.e., larger guard bands) can support reasonable-cost filtering and careful antenna system placement to reduce interference at the mobile stations and base stations. Although not shown in this example, the unpaired frequency band 130 and/or the paired frequency bands 110, 120 may include guard bands or sub-bands allocated for other purposes. As mentioned earlier, guard bands can assist in reducing interference. With less separation 140, 150 (i.e., smaller guard bands), the filtering at the base stations is more expensive, but usually not cost-prohibitive. With less separation, though, improved filtering at the mobile stations becomes very expensive and sufficient antenna system separation may become infeasible.

Although the three bands 110, 120, 130 have been described as an unpaired band 130 situated between the two parts of a paired spectrum 110, 120, adjacently interfering bands do not require this particular configuration. The three bands may all be unpaired, there may be only two adjacent bands, the center band may be paired with another band (not shown), etc. The issue of adjacent channel interference occurs most notably when one frequency handles uplink transmissions and an adjacent frequency concurrently handles downlink transmissions, although it is also possible for concurrent adjacent uplink transmissions or concurrent adjacent downlink transmissions to result in interference.

Figure 2:
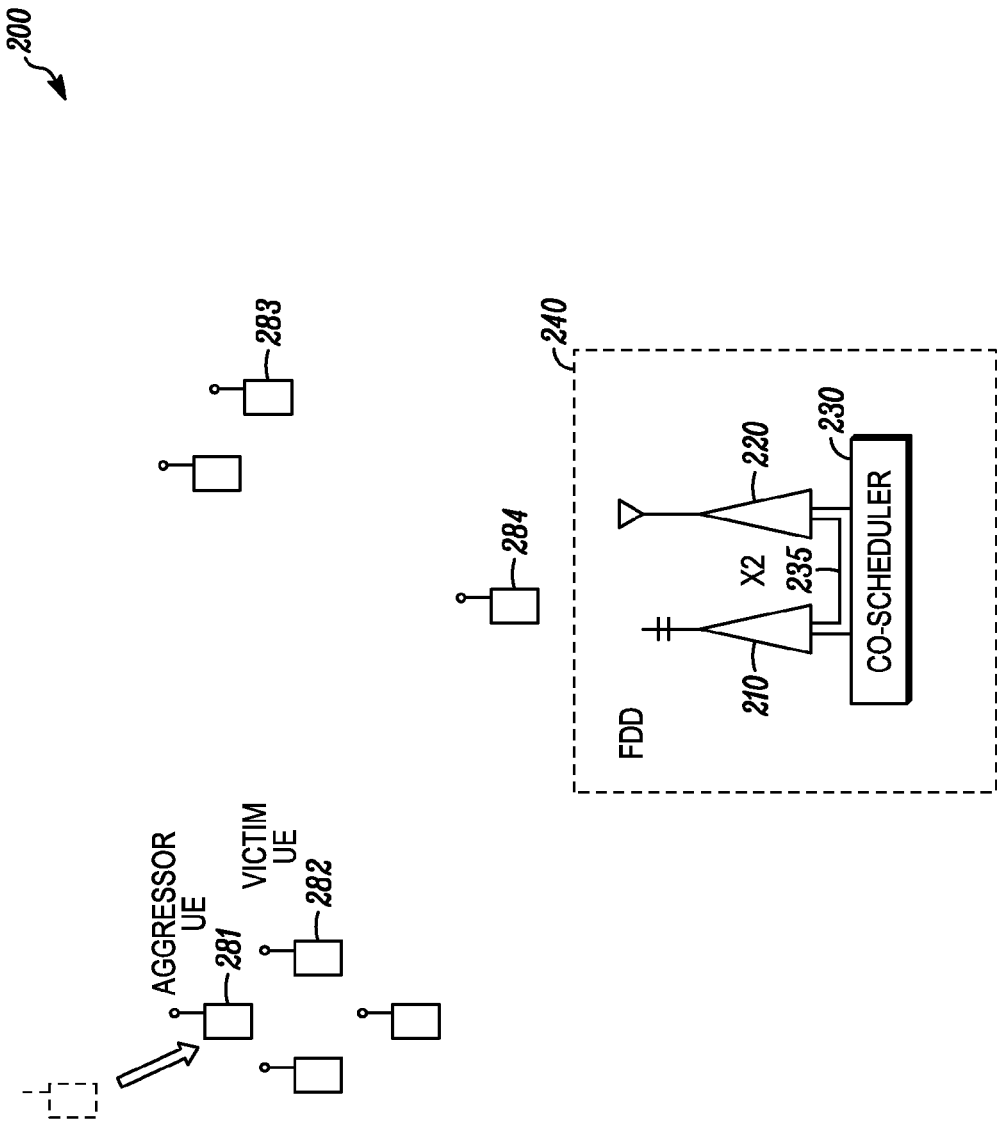
FIG. 2 shows an example of user equipment geographical distribution in a coverage region having a spectrum allocation diagram with adjacent frequency bands similar to FIG. 1.

FIG. 2 shows an example of user equipment geographical distribution 200 in a coverage region having a spectrum allocation diagram with three adjacent frequency bands similar to FIG. 1. The region includes a first base station 210 for allocating frequency subcarriers and scheduling uplink and downlink communications with wireless user equipment operating in the paired frequency bands 110, 120 of FIG. 1. The system also includes a second base station 220 for allocating frequency subcarriers and scheduling uplink and downlink communications with wireless user equipment operating in the unpaired frequency band 130 of FIG. 1. The second base station is part of an adjacent carrier system relative to the first base station (and vice versa). The two base stations 210, 220 cooperate through a backbone interface 235. The backbone interference may be an X2 interface, a proprietary interface, or use some other standard such as Ethernet. The backbone interface 235 is usually wired but may be wireless. In one embodiment, the first and second base stations can be of two different RATs.

A co-scheduler 230 coordinates communications in power, time, and frequency between the two base stations 210, 220 and their served UEs. The co-scheduler 230 may be physically separate from both base stations and coupled to both base stations (e.g., through the backbone interface 235), or the co-scheduler 230 may be part of one or both of the base stations and coupled to the other base station through the backbone interface 235 (not shown). The co-scheduler 230 has knowledge of current and future uplink and downlink assignments (both frequency subcarriers and timing) for each served UE of both base stations. Note that in some architectures, the two base stations may be implemented as a single base station structure (or composite base station), and the co-scheduler may simply be termed a "scheduler" (or composite scheduler). In one embodiment, the two base stations (or single composite base station) correspond to two different RATs and the composite scheduler will translate the uplink and downlink assignments when determining co-existence issues such as adjacent channel interference or radio desense.

The two base stations 210, 220 may be co-sited 240 as optionally shown. Alternately, the base stations 210, 220 may be not co-sited but close enough to cause adjacent channel interference were coexistence methods not used. Co-sited or closely-located base stations help the co-scheduler to more rapidly and conveniently determine information used as input to scheduling decisions at both base stations, such as timing differences (e.g., propagation and multipath) for both base stations, and estimate the coverage areas of both base stations.

Conventional approaches to mitigate interference 181, 185 (see FIG. 1) between the two co-sited (or closely located) base stations 210, 220 include stringent site filtering and physical separation of transmit and receive antenna systems. Also, adjacent channel interference can be reduced by one eNB locating its downlink carrier frequency on a raster location that provides a guard band with respect to the uplink band of the other eNB, although this is clearly inefficient in terms of downlink spectrum.

Further mitigation of interference can be achieved using the co-scheduler 230 implemented to control wireless resource allocation and power levels in both the paired bands 110, 120 and the unpaired band 130 through their respective eNBs 210, 220. The co-scheduler can separate potentially interfering transmissions and receptions in frequency by, for example, preferentially scheduling Physical Downlink Shared Channel (PDSCH) physical resource blocks (PRBs) in a high frequency portion of the unpaired band 130 and/or preferentially scheduling Physical Uplink Shared Channel (PUSCH) PRBs in a low frequency portion of the paired band 110. The co-scheduler can also (or alternately) reduce potentially interfering transmissions by, for example, suppressing or reducing the power of aggressor UE transmissions (e.g., near the frequency boundary that is related to the adjacent band interference).

User equipment being served by either base station, perhaps including a mobile device being served by both base stations (e.g., collocated UEs), are geographically distributed around the base stations. As a UE moves and gets closer to another UE, interference 191, 195 may result as shown in FIG. 1. UEs may move to create a wide variety of geographic configurations, including within a building, inside a moving vehicle, and along streets and sidewalks. As particular UEs move apart, adjacent channel interference between those two UEs may decrease. At the same time, adjacent channel interference may increase due to a closer proximity to another UE.

If the interference 191, 195 arises from operation in adjacent bands by the same device (i.e., collocated UEs), UE mobility does not (of course) reduce the interference 191, 195 but turning on/off any one of the transceivers would affect interference. Throughout this description, collocated victim and aggressor UEs (or UEs incorporated into a shared device) may be within the same device housing or physical implementation.

In an example, a first UE 281 transmits in a frequency band to its serving base station 210 while a second UE 282 is receiving signals in an adjacent frequency band from its serving base station 220. While the UEs 281, 282 are distant from each other (e.g., over 10 meters apart), the transmitted signal of the first UE 281 may not interfere much with reception at the second UE 282 in an adjacent band. When the UEs come close to each other (e.g., within 10 meters), however, the transmitted signal of the aggressor UE 281 may desense the victim UE's receiver such that the second UE 282 cannot properly receive and decode the signal in the adjacent channel from its serving base station 220. Although transmissions from nearby UEs may cause interference with reception by a victim UE 282, transmissions from distant UEs 283, 284 are less likely to cause significant interference while the second UE 282 is receiving.

In a first scenario, the aggressor UE 281 transmits on the paired spectrum uplink band 110 while the victim UE 282 receives in the unpaired spectrum 130. In a second scenario, the aggressor UE 281 transmits on the unpaired band 130, and the transmissions may interfere with the victim UE 282 receiving on the paired spectrum downlink band 120. Again, transmissions from the other UEs 283, 284 that are geographically separated from the second UE 282 are less likely to cause significant interference while the second UE 282 is receiving. Note that, in this document, the aggressor UE is consistently considered the first UE 281 (UE1) while the victim UE is consistently considered the second UE 282 (UE2). The UEs, however, may be served by either (or both) of the base stations 210, 220, depending on each UE's configurations.

Figure 3:
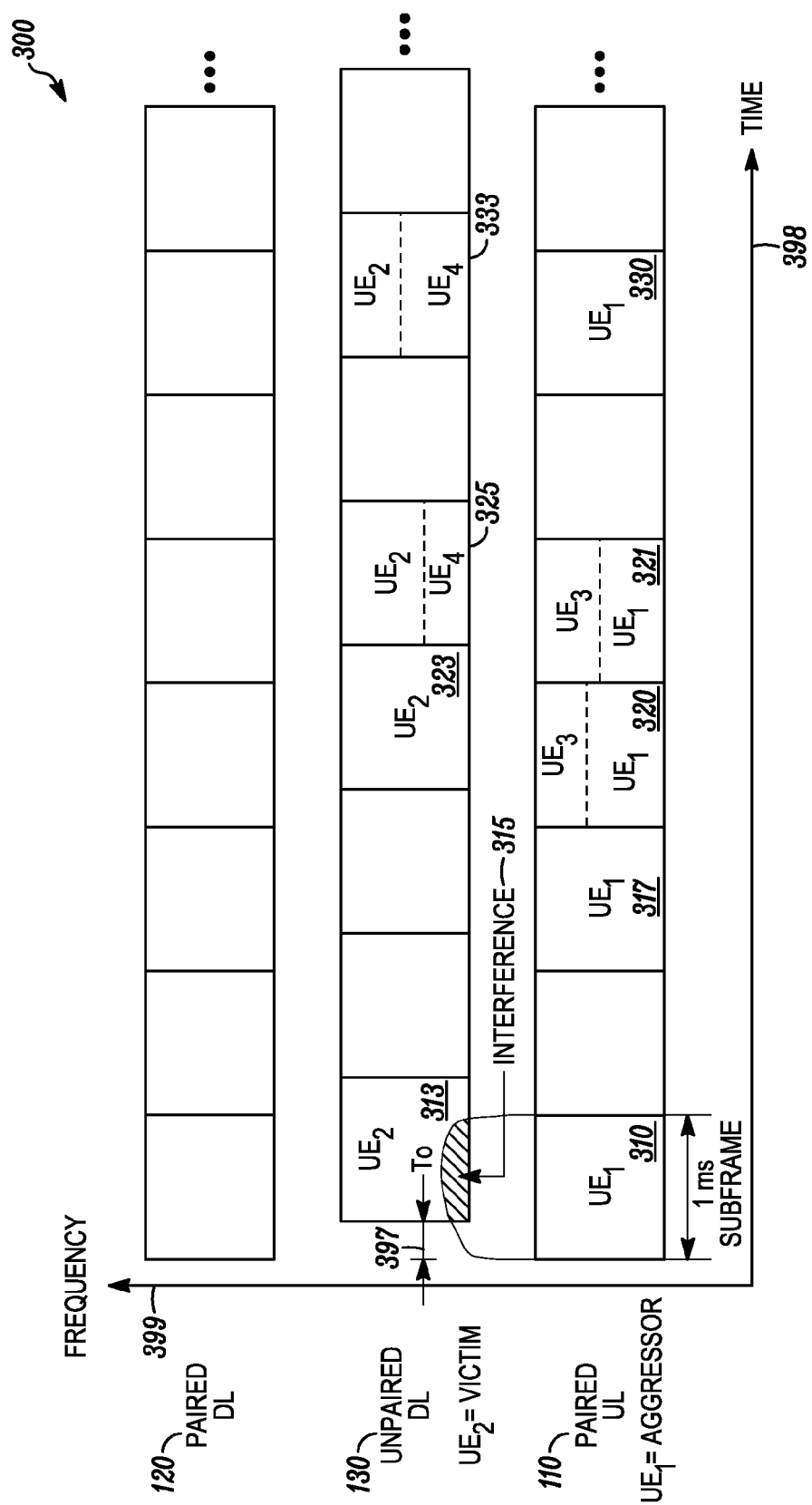
FIG. 3 shows an example of a time and frequency graph for multi-radio coexistence.

FIG. 3 shows an example of a time and frequency graph 300 for multi-radio coexistence for the aggressor and victim user equipment 281, 282 shown in FIG. 2. The x-axis 398 is time and the y-axis 399 is frequency. The example LTE sub-frames are 1 ms in duration and may use one or more frequency subcarriers within a frequency band to transmit the signals. A timing offset $T_O$ 397 indicates whether the sub-frames on each frequency band are synchronized ($T_O$=0) or not ($T_O \neq 0$). Note that a timing offset is different from a timing advance. This timing offset information may be unknown to either UE and/or either eNB. This timing offset information, however, is known by the co-scheduler 230 and used when allocating sub-carriers and sub-frames to each UE being served by the eNBs associated with the co-scheduler. Note that in all of the example time and frequency graphs shown, the relative timing of signals on frequency resources 110, 120, 130 may vary according to the relative synchronism of the base stations serving each frequency band 110, 120, 130, the relative positions of UE's 281 and 282, as well as other factors.

As mentioned with respect to FIG. 2's first scenario, the first UE 281 is transmitting during a subframe 310 on an FDD uplink frequency band 110 while a second UE 282 is receiving in a subframe 313 on an adjacent frequency band 130. In this example, the adjacent frequency band 130 is implemented as an unpaired downlink frequency band, but it could easily be the downlink band of a pair of FDD frequency bands.

If the two UEs 281, 282 are near each other (e.g., within 10 meters of each other, including possibly being collocated within the same device), the signaling or data transmission on the upper subcarrier frequencies of the transmission in sub-frame 310 can cause interference 315 to signaling or data regions for the second UE 282 on the lower subcarrier frequencies of the reception subframe 313 during the overlapping time period when the first UE 281 is transmitting and the second UE 282 is receiving. Note that, because $T_O \neq 0$, only part of the sub-frame 313 (in time) experiences adjacent channel interference. If $T_O$=0, then the entire sub-frame 313 (in time) might experience adjacent channel interference. Also, depending on the amount of adjacent channel leakage and the "width" of the adjacent band, it is possible that only part of the reception sub-frame 313 (in frequency) experiences adjacent channel interference, as shown. Other situations may have differing amounts of the sub-frame 313 (in frequency) that experience adjacent channel interference, and this frequency amount depends on filtering at the aggressor UE and at the victim UE, antenna separation between the aggressor UE and the victim UE, the power of the transmitted signal from the aggressor UE, the configuration of the transmission in frequency at the aggressor UE, restrictions on UE emission spectra signaled by the eNB, and other factors.

If the two UEs 281, 282 are collocated (i.e., within the same device where it is noted that such a combination of UEs may be denoted as a single UE that is aggregating two or more of the frequency bands 110, 120, 130), the transmitting UE 281 may be aware, through internal signaling, when the receiving UE 282 is receiving and report the frequency and timing information to the base station 210 serving the aggressor UE 281, and the co-scheduler 230 can make scheduling adjustments to mitigate interference.

This may be extended to include the situation where the co-scheduler 230 has independent and uncoordinated schedulers for the base stations 210, 220, and in the extreme case where the base stations 210, 220 are elements of separate and uncoordinated networks. In this instance, based on the report by the victim UE 282 regarding interference possibly caused by the aggressor UE 281, the scheduler controlling the victim UE's base station may modify its allocation of time-frequency resources to victim UE 282 to reduce interference.

Regardless of whether the UEs are collocated or not, a report by the victim UE 282 on the interference possibly caused by aggressor UE 281 may include statistics on the interference received and attributed to aggressor UE 281, including time and frequency statistics and patterns, power levels, signal to noise ratios, etc. If the UEs are collocated, additional information such as configuration information regarding the base station 210 serving the aggressor UE 281 can be included. This additional information can include downlink or uplink subframe configuration, time or frequency dimension, control channel configuration, and other pieces of information that are available to the victim UE from the aggressor UE.

If the two UEs 281, 282 are not collocated, the UEs may move freely relative to each other and thus sometimes be far away from each other and sometimes be near to each other. When the two UEs 281, 282 are near to each other, interference 315 is more likely to result.

The UEs 281, 282, 283, 284 may report location information to their respective base stations 210, 220, which may be used to help determine when UEs may interfere with each other due to proximity. Metrics such as path loss, transmit power state, relative timing advance, and/or angle of arrival (AoA) estimates may be used to determine the approximate location of a UE. Information from another receiver within the UE, such as satellite navigation system location (e.g., GPS, GLONASS, GALILEO), may be used to determine location information for that UE. Also, location information for potential victim UEs can be sent from a victim UE's base station 220 to a potential aggressor UE's base station 210 using the backbone interface 235. Further statistical location information can be used to make location predictions (e.g., frequent UE behavior due to the locations of roads or an individual's habits and schedule).

When the co-scheduler 230 receives information indicating that there is a potential victim UE 282 (e.g., that a UE 282 receiving in an adjacent band is proximal to a transmitting UE 281), the co-scheduler 230 modifies its radio resource allocation and/or power control, to the aggressor UE 281, to the victim UE 282, or to both UEs, to mitigate interference. For example, the co-scheduler 230 controls the eNB 210 serving the aggressor UE 281 to direct the aggressor UE 281 to transmit on a second set of sub-carrier frequencies in a sub-frame 320 when the victim UE is receiving on an overlapping subframe 323 on the adjacent frequencies. This second set of sub-carriers excludes one or more sub-carriers near the edge of the frequency band, or in some other preferential frequency or time-frequency location. (In some instances, intermodulation effects can result in aggressor frequencies more distant from the victim frequency band being significant.) Hence, the aggressor UE 281 will not transmit in the frequency-portion of the paired uplink band 110 that tends to cause adjacent channel leakage into the unpaired band 130 over the time period 323 when the victim UE is receiving. Alternately, or in addition, the co-scheduler 230 controls the eNB 210 serving the aggressor UE 281 to direct the aggressor UE 281 to transmit using a lower power level in a sub-frame 320 when the victim UE is receiving during an overlapping subframe 323 on the adjacent frequencies.

A distant UE (e.g., third UE 283 from FIG. 2) may be assigned the uplink sub-carriers that are vacated by the aggressor UE 281 in the time slot 320. The third UE 283 is less likely to cause adjacent channel interference because the power levels of the signals reaching the victim UE 282 are attenuated due to the distance. Such pairing of UEs 281, 283 with large angular separation with respect to the eNB 210, together with beam-steering using distinct spatial arrays at the eNB 210, can be used in addition to the co-scheduling methods to further mitigate adjacent band interference. For example, if an eNB 210 uses a Grid-of-Beams (GoB) approach to sub-divide a sector into multiple fixed beams, the eNB can simply pair UEs from two beams having large spatial isolation.

Additionally or alternately, the co-scheduler 230 can direct the second eNB 220 to adjust the downlink sub-carriers allocated to the victim UE 282 to avoid reception in frequencies near the edge of the band 130 closest to the interference source in a subframe 325, 333 that is likely to experience interference. A distant UE (e.g., fourth UE 284 from FIG. 2) may be assigned the downlink subcarriers that are vacated by the victim UE 282 in the time slot 325, 333. The fourth UE is less likely to experience adjacent channel interference in subframe 333 because the power levels of the signals reaching the distant UE 284 from the aggressor UE in subframe 330 are attenuated due to the distance. The fourth UE is even less likely to experience adjacent channel interference in subframe 325 due both to distance and a larger frequency separation between the aggressor UE 281 subcarriers and the fourth UE 284 subcarriers at both subframes 321 and 325.

Note also that, when a specific transmission subframe 317 of the aggressor UE 281 does not overlap in time with the victim UE's reception subframes 313, 323, 325, 333, no change in subcarrier frequencies allocated to the aggressor UE is needed for that subframe 317. The co-scheduler is aware that the victim UE 282 is not assigned to receive during a subframe that overlaps (in time) with transmission subframe 317. Of course, the co-scheduler or eNB may choose to limit the subcarrier frequencies allocated to the aggressor UE during the whole time duration (including subframe 317) when the victim UE is nearby in order to reduce complexity, signaling overhead, and/or account for possible timing advance errors.

When the aggressor UE 281 and the victim UE 282 are no longer proximal to each other, the scheduler 230 may return to using any portion (or the full portion) of sub-carriers in the paired uplink band 110 because adjacent band interference is less likely to occur when the UEs are distant to each other. The same metrics available for determining that UEs are proximal to each other (e.g., path loss, transmit power state, relative timing advance, angle of arrival (AoA) estimates, GPS location, and/or statistical location information) may also be used to determine that the UEs are no longer proximal to each other.

Note that the victim UE 282 may be collocated with the aggressor UE 281, in which case the two UEs will always be proximal to each other (except when one of the transceivers is off).

By reducing the scheduling of time-overlapping transmissions and receptions in adjacent bands of proximal UEs, adjacent channel interference can be reduced. By disallowing frequencies near band edges during those time periods when adjacent channel interference is likely, due to proximity of aggressor and victim UEs, conventional mobile station filtering may be acceptable. When the aggressor UE and potential victim UE are no longer close to each other, the co-scheduler 230 can allocate frequency subcarriers and subframes without adjacent channel interference restrictions.

Figure 4:
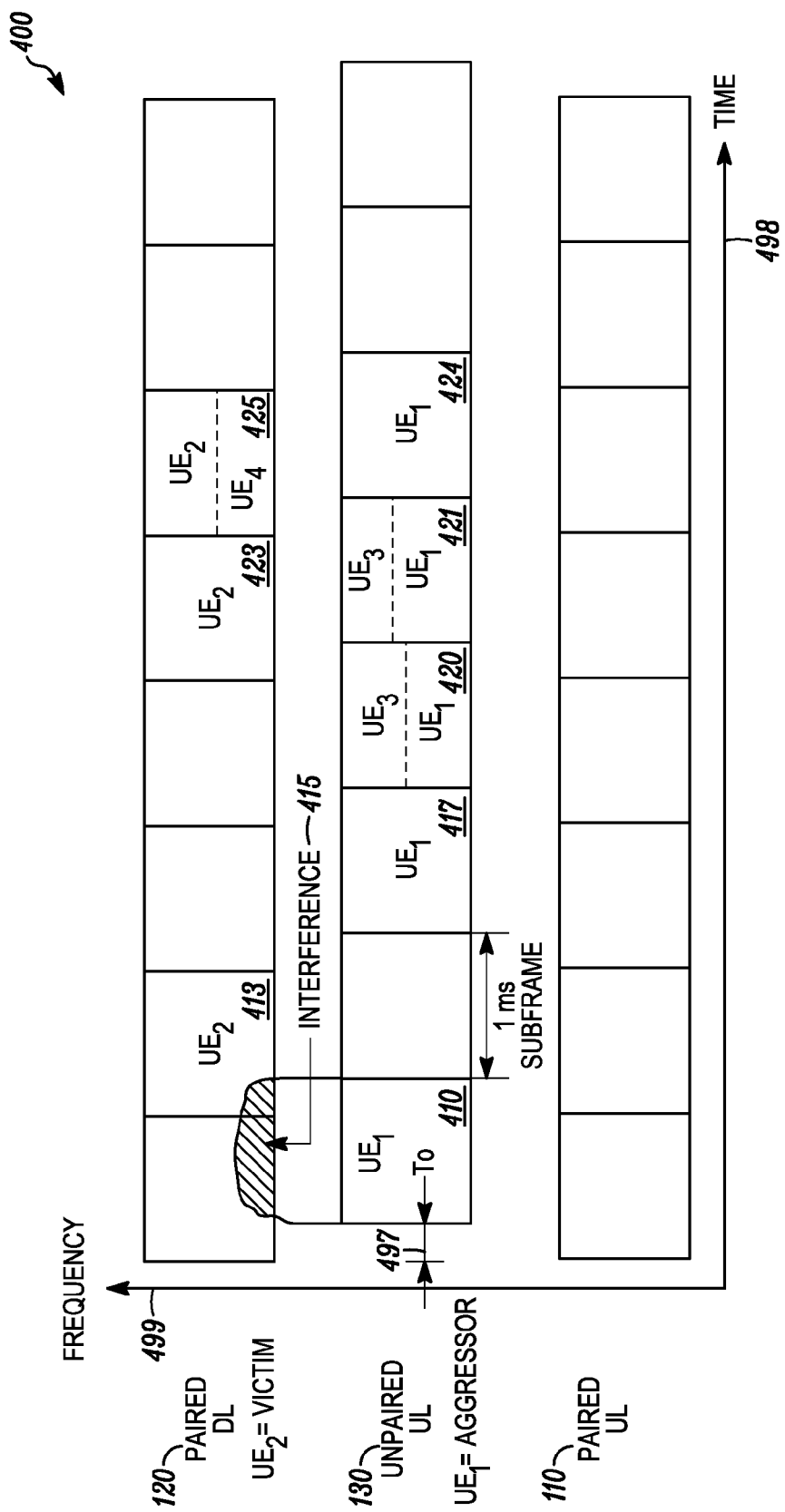
FIG. 4 shows another example of a time and frequency graph for multi-radio coexistence.

FIG. 4 shows another example of a time and frequency graph 400 for multi-radio coexistence for the aggressor and victim user equipment 281, 282 shown in FIG. 2. FIG. 4 is similar to FIG. 3 except that FIG. 4 assumes the second scenario described with respect to FIG. 2. In the second scenario, an aggressor UE 281 transmits on the unpaired frequency band 130 and a victim UE 282 receives on an adjacent FDD downlink band 120. Although adjacent frequency band 130 is implemented as an unpaired uplink frequency band, it could easily be the uplink band of a pair of FDD frequency bands. The x-axis 498 is time and the y-axis 499 is frequency. This is also an LTE example with subframes of 1 ms duration and multiple frequency subcarriers within each frequency band 110, 120, 130. (As mentioned previously, other RATs may be used by one or both of the wireless networks.) As with FIG. 3, the timing offset 497 can be zero (i.e., the subframes of the aggressor UE and victim UE are synchronized) or non-zero. This timing offset information is known by the co-scheduler 230 and used when allocating sub-carriers and sub-frames to each UE being served by the eNBs associated with the co-scheduler.

When the aggressor UE 281 is near the victim UE 282, transmissions on the upper frequencies of the unpaired band 130 can cause interference 415 for the second UE 282 on the lower subcarrier frequencies of a reception subframe 413 during the overlapping time period when the first UE 281 is transmitting and the second UE 282 is receiving. Note that, because $T_O \neq 0$, only part of the sub-frame 413 (in time) experiences adjacent channel interference. If $T_O = 0$, then none of sub-frame 413 (in time) would experience adjacent channel interference. Also, depending on the amount of adjacent channel leakage and the "width" of the adjacent band, perhaps only part of the reception sub-frame 413 (in frequency) experiences adjacent channel interference, as shown. Other situations may have differing amounts of the sub-frame 413 (in frequency) that experience adjacent channel interference, and this frequency amount depends on filtering at the aggressor UE and at the victim UE, antenna separation between the aggressor UE and the victim UE, the power of the transmitted signal from the aggressor UE, and other factors such as those previously described.

If the two UEs 281, 282 are collocated (i.e., within the same device), the transmitting UE 281 may be aware, through internal signaling, when the receiving UE 282 is scheduled to receive on an adjacent frequency. The transmitting UE 281 can then report the frequency and timing information to the base station 220 serving the aggressor UE 281, and the co-scheduler 230 can make scheduling adjustments to mitigate interference.

If the two UEs 281, 282 are not collocated, the UEs may move freely with respect to each other and thus sometimes be far away from each other and sometimes be near to each other. When the two UEs 281, 282 are near each other, interference 415 is more likely result.

The UEs 281, 282, 283, 284 may report location information to their respective base stations 210, 220, which may be used to help determine when UEs may interfere with each other due to proximity. Metrics such as path loss, transmit power state, relative timing advance, and/or angle of arrival (AoA) estimates may be used to determine the approximate location of a UE. Information from another receiver within the UE, such as GPS location, may be used to determine location information for that UE. Additionally, location information for a potential victim UE can be sent from the victim UE's base station 210 to a potential aggressor UE's base station 220 using the backbone interface 235.

When the co-scheduler 230 receives information indicating that there is a potential victim UE 282 (e.g., that a UE 282 receiving in an adjacent band is proximal to the transmitting UE 281), the co-scheduler 230 controls the eNB 220 serving the aggressor UE 281 to allocate a second set of sub-carrier frequencies to the aggressor UE 281 on a subframe 420, 421 where the victim UE 282 is receiving on an overlapping subframe 423 on the adjacent band 120. This second set of sub-carriers excludes one or more sub-carriers near the edge of the uplink frequency band 130 closest to the downlink frequency band 120. Hence, the aggressor UE 281 will not transmit in the frequency-portion of the unpaired band 130 that tends to cause adjacent channel leakage into the paired downlink band 120 during the same time period 423 as when the victim UE is receiving.

A distant UE (e.g., third UE 283 from FIG. 2) may be assigned the uplink sub-channels that are vacated by the aggressor UE 281 in the time slot 420, 421. The third UE 283 is less likely to cause adjacent channel interference because the power levels of the signals reaching the victim UE 282 are attenuated due to the distance. Such pairing of UEs 281, 283 with large angular separation with respect to the eNB 210, together with beam-steering using distinct spatial arrays at the eNB 210, can be used in addition to the co-scheduling methods to further mitigate adjacent band interference. For example, if an eNB 210 uses a Grid-of-Beams (GoB) approach to sub-divide a sector into multiple fixed beams, the eNB can simply pair UEs from two beams having large spatial isolation.

Additionally or alternately, the co-scheduler 230 can direct the victim UE's eNB 210 to adjust the downlink sub-carriers allocated to the victim UE 282 to avoid reception in frequencies near the edge of the band 120 closest to the interference source in a subframe 425 that overlaps with an uplink subframe 421, 424 of the aggressor UE 281. A distant UE (e.g., UE 284 from FIG. 2) may be assigned the uplink sub-carriers that are unused by the UE 282 on the FDD downlink band 120. The fourth UE is less likely to experience adjacent channel interference in a later portion of subframe 425 because the power levels of the signals reaching the distant UE 284 from the aggressor UE in subframe 424 are attenuated due to the distance. The fourth UE is even less likely to experience adjacent channel interference in an earlier portion of subframe 325 due both to distance and a larger frequency separation between the aggressor UE 281 subcarriers and the fourth UE 284 subcarriers at both subframes 421 and 425.

Note also that, when a specific transmission subframe 417 of the aggressor UE 281 does not overlap in time with the victim UE's reception subframes 413, 423, 425, no change in subcarrier frequencies allocated to the aggressor UE is needed for that subframe 417. The co-scheduler is aware that the victim UE 282 is not assigned to receive during a subframe that overlaps with transmission sub-frame 417. Of course, the co-scheduler or eNB may choose to limit the subcarrier frequencies allocated to the aggressor UE during the entire time duration (including subframe 417) when the victim UE is nearby in order to reduce complexity, signaling overhead, and/or account for possible timing advance errors. Note also, that it may be necessary to limit the subcarrier frequencies allocated to the aggressor UE in order to avoid saturation or blocking of the victim UE receiver even if the subcarrier frequencies allocated to the victim UE are restricted.

When the aggressor UE 281 and the victim UE 282 are no longer proximal to each other, the scheduler 230 may return to using any portion (or the full portion) of sub-carriers in the unpaired band 130 because adjacent band interference is less likely to occur when the UEs are distant to each other. The same metrics available for determining that UEs are proximal to each other (e.g., path loss, transmit power state, relative timing advance, angle of arrival (AoA) estimates, and/or GPS location) may also be used to determine that the UEs are no longer proximal to each other.

Note that the victim UE 282 may be collocated with the aggressor UE 281, in which case the two UEs will always be proximal to each (except when one of the transceivers is off).

By reducing the scheduling of time-overlapping transmissions and receptions in adjacent bands of proximal UEs, adjacent channel interference can be reduced. By disallowing frequencies near band edges during those time periods when adjacent channel interference is likely due to proximity of aggressor and victim UEs, conventional mobile station filtering may be acceptable. When the aggressor UE and potential victim UE are no longer close to each other, the co-scheduler 230 can allocate frequency subcarriers and subframes without adjacent channel interference restrictions.

Figure 5:
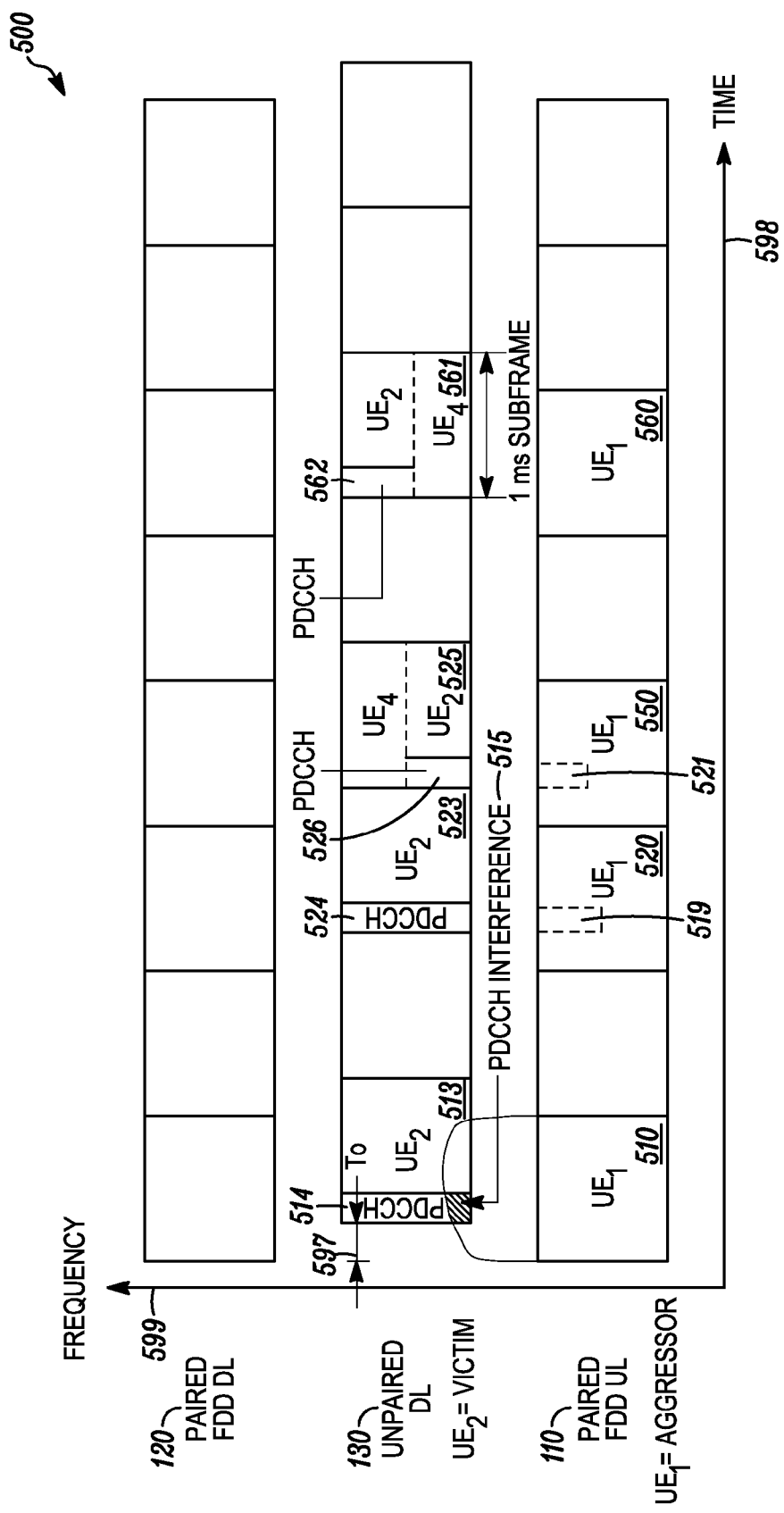
FIG. 5 shows yet another example of a time and frequency graph for multi-radio coexistence.

FIG. 5 shows yet another example of a time and frequency graph 500 for multi-radio coexistence. FIG. 5 is similar to FIG. 3 in that the unpaired band 130 is configured as a downlink channel adjacent to an FDD uplink band 110, but (like FIG. 3) it could alternately be the downlink band of a pair of FDD frequency bands. Thus, an aggressor UE 281 transmitting on the FDD uplink band 110 in subframe 510 may cause interference to a potential victim UE 282 receiving in the downlink band 130 during subframe 513. Similar to previous graphs, the x-axis 598 is time and the y-axis 599 is frequency.

In the LTE system, Physical Downlink Control Channel (PDCCH) resources and reference symbols (such as a cell-specific reference symbol) are transmitted by a serving eNB 220 during the first few (1-3) symbols of a subframe. (Cell-specific reference symbols are transmitted in symbols 1 and 2, but are also transmitted in other symbols in the subframe.) The PDCCH instructs its served UEs (e.g., victim UE 282) regarding its time and frequency allocation for the current downlink subframe on a Physical Downlink Shared Channel (PDSCH) and for a future uplink subframe on a Physical Uplink Shared Channel (PUSCH). If the PDCCH is not properly decoded, the victim UE 282 will have difficulty obtaining its physical channel data on the PDSCH and, due to a failure to decode the uplink grant, will not be able to transmit its physical channel data on the future PUSCH. Thus, the difference between FIG. 3 and FIG. 5 is that the current time and frequency graph 500 is only seeking to mitigate interference 515 on the PDCCH 514 (rather than trying to mitigate interference over the entire subframe 513 of the victim UE 282).

As mentioned earlier, PDCCH occurs in the first few (1-3) symbols of a subframe, and thus the timing offset 597, which is known by the co-scheduler 230, can be used to calculate when an aggressor UE's uplink transmission should be muted 519, 521. Thus, a transmission with PDCCH interference mitigation occurs in a subframe 520, 550 yet mutes 519, 521 transmissions during the time-interval and at subcarrier frequencies near where a PDCCH 524, 526 is expected by a proximal UE 282 on a subframe 523, 525 in an adjacent band 130. Alternately, the muted section 519, 521 may extend through all frequencies of the aggressor UE's transmission subframe 520, 550. This simplifies implementation of the muting to control of a power amplifier in the aggressor UE's transmitter to fully mute transmission or to partially mute transmission for a certain amount of time (e.g., 1-3 symbols) by decreasing the transmit power of a signal by a given amount (e.g., a certain number of dBs, a certain percentage of power, below a certain power level, etc.). This method may require special handling of an automatic gain control (AGC) set-point (e.g., AGC tracking may have to be disabled) when the aggressor UE's transmission is altered as proposed.

Note that, due to error correction coding, it may be possible that the aggressor UE can survive the modification to the subframes 520, 550 with PUCCH "symbol puncturing". In other words, despite the muting 519, 521 of the portions of the subframe that may cause interference with the PDCCH 524, 526 being sent in the adjacent channel, the eNB 210 may be able to properly decode the information transmitted in that subframe 520, 550.

As illustrated, a PDCCH 526, 562 may occur on less than all of the subcarriers in a subframe 525, 561. If a subcarrier of the PDCCH 526 is on the edge of the band closer to the interference frequencies, then the co-scheduler 230 and eNB 210 serving the aggressor UE 281 would continue to direct the first UE 281 to mute 521 its transmissions at least during the time and frequencies that are likely to cause interference with the PDCCH 526. If PDCCH 562 occurred only in the upper frequency subcarriers of a subframe 561, interference mitigation might not be implemented as shown in subframe 560. These techniques may be used to mitigate interference for other scheduled and non-scheduled physical channels such as PRACH transmission, Sounding Reference Symbol (SRS) transmission, or uplink resources allocated in a semi-persistently scheduled (SPS) fashion.

The techniques illustrated in FIGS. 3-5 may be implemented together in any combination. Thus, each physical channel (PDCCH, PDSCH) may be subject to a distinctive interference avoidance strategy. In other words, modifications to an aggressor UE's transmissions to enhance PDCCH reception may occur in time and/or frequency, and modifications to an aggressor UE's transmissions to enhance PDSCH reception may occur in a different time and/or frequency.

In a collocation situation, where the same device contains the aggressor UE and the victim UE, both the device and the eNB co-scheduler may have complete knowledge of the uplink and downlink resource allocation of the device and can schedule appropriately. Looking at FIG. 3, for example, the interference 315 would not occur because the eNB co-scheduler can predict a potential interference and modify the subcarriers and timing of either UE (or both UEs) within the collocated mobile device before the interference could occur.

Figure 6:
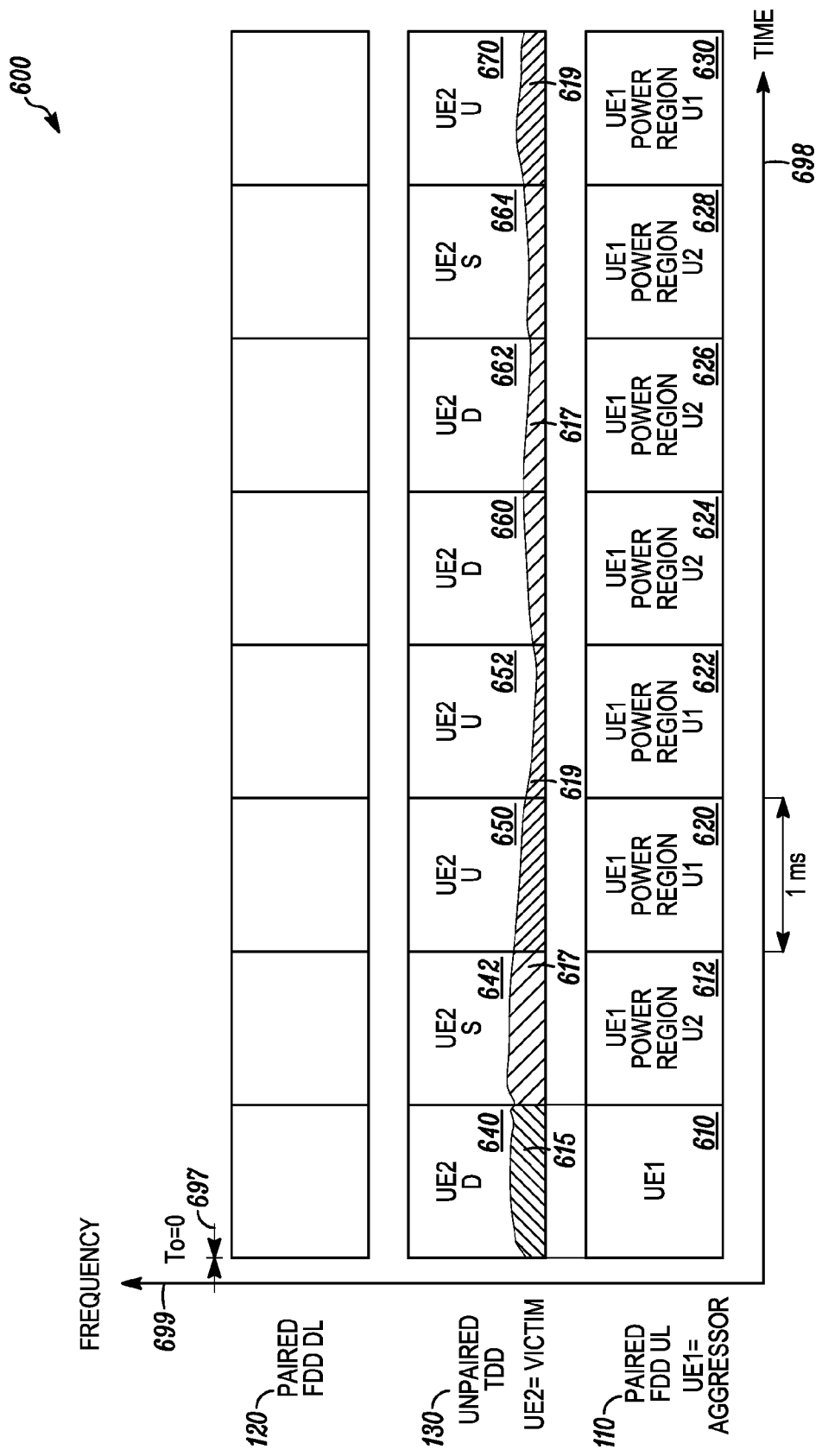
FIG. 6 shows a further example of a time and frequency graph for multi-radio coexistence.
Figure 7:
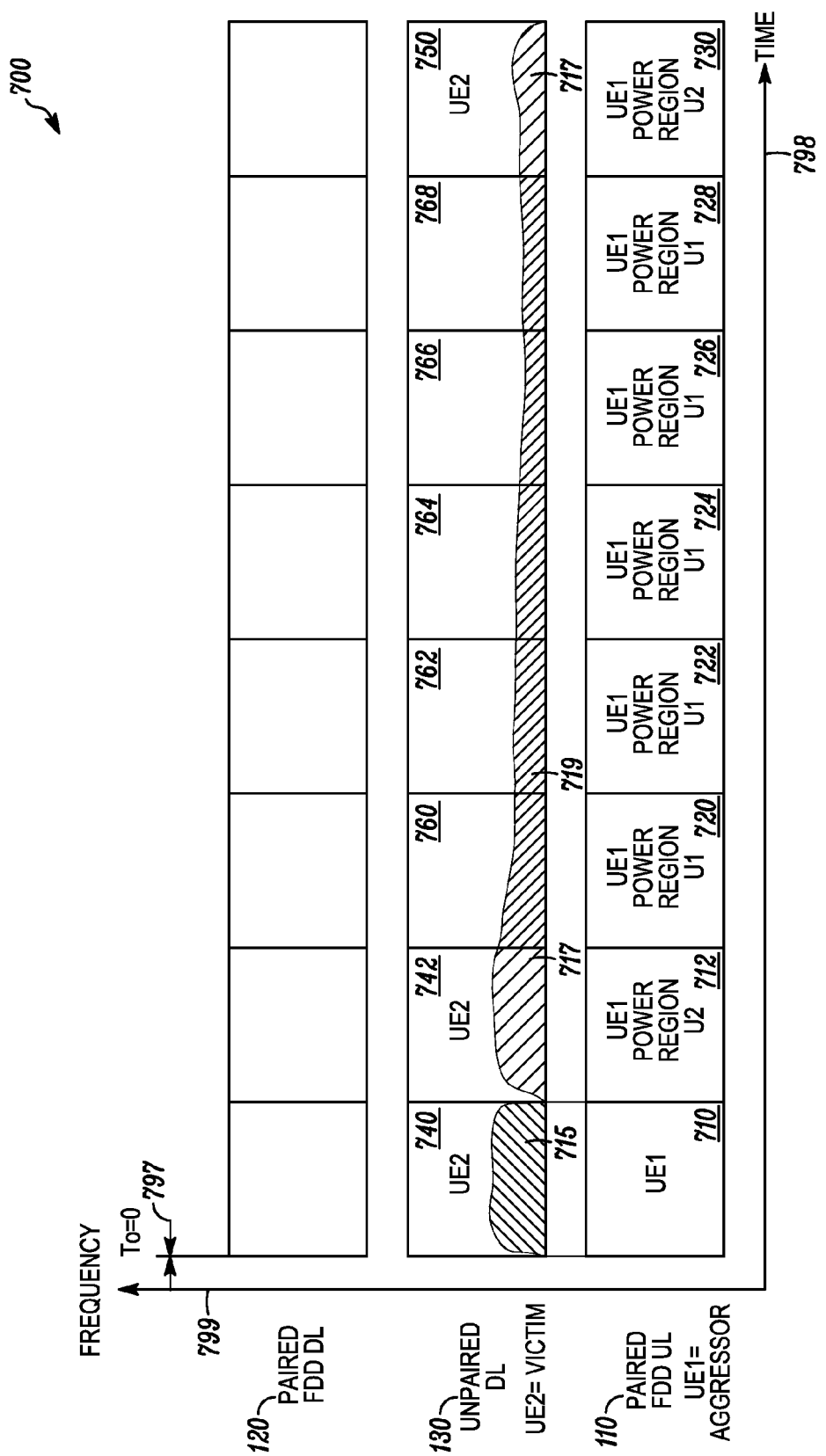
FIG. 7 shows a yet further example of a time and frequency graph for multi-radio coexistence.

FIGS. 6-7 show further examples of time and frequency graphs for multi-radio coexistence. In FIGS. 3-5, coexistence is mitigated by allocating a second set of subcarriers to an aggressor UE when there is a proximally-located victim UE operating in an adjacent frequency band. The second set of subcarriers excludes at least one subcarrier from a previous, first set of transmission subcarriers. In many implementations, the excluded subcarrier would be near a frequency band edge. The excluded subcarrier can be excluded for a complete subframe or for a portion of a subframe.

In FIGS. 6-7, instead of modifying subcarrier allocations when there is a proximally-located victim UE operating in an adjacent frequency band, an aggressor UE's transmission power is modified when there is a proximally-located victim UE operating in an adjacent frequency band. Of course, both subcarrier and transmission power allocations can be modified by combining teachings from FIGS. 3-7. And the modified transmission power can be used for a complete subframe or for a portion of a subframe.

FIG. 6 shows a further example of a time and frequency graph 600 for multi-radio coexistence. The x-axis 698 is time and the y-axis 699 is frequency. In this scenario, the aggressor UE 281 is transmitting on a paired FDD uplink band 110 while a victim UE is transmitting and receiving (at different times) on an unpaired TDD frequency band 130. Because the frame timing of the TDD and FDD networks may be uncoordinated and hence unsynchronized, the TDD and FDD subframe boundaries (as well as frame boundaries) may not be aligned. In order to simplify the explanation of FIG. 6, however, the timing offset 697 is shown as zero. As with the other LTE examples, each subframe is of 1 ms duration and there are multiple frequency subcarriers within each frequency band 110, 120, 130.

A TDD link on the unpaired frequency band 130 includes downlink (D) subframes 640, 660, 662, uplink (U) subframes 650, 652, 670, and special (S) subframes 642, 664. A special TDD subframes includes three sections: a downlink pilot time slot (DwPTS), a guard period (GP), and an uplink pilot time slot (UpPTS). Thus, a special subframe has both uplink and downlink components. Presently, LTE has seven TDD downlink/uplink configurations, which define the pattern of D, S, and U subframes within a given frame. The example shown in FIG. 6 shows a victim UE using TDD configuration 1. Of course, other TDD configurations may be defined and used.

When an aggressor UE 281 is near the victim UE, aggressor UE transmissions on the upper frequencies of the paired band 110 can cause interference 615 for the victim UE on the lower subcarrier frequencies of a D subframe 640 (or an S subframe reception portion) during the overlapping time period (e.g., subframes 610, 640) when the first UE 281 is transmitting and the victim UE is receiving.

If the co-scheduler 230 receives information indicating that there is a potential victim UE (e.g., that a UE 282 receiving in an adjacent band is proximal to a transmitting UE 281), the co-scheduler 230 can provide a second set of power values to the aggressor UE 281. The co-scheduler 230 can also provide to the aggressor UE 281 other UE2 scheduling information such as timing offset, TDD downlink/uplink configuration, or scheduled UE2 reception subframe information. In this example, the timing offset is zero and the TDD downlink/uplink configuration is configuration 1. The TDD downlink/uplink configuration or scheduled UE2 reception subframe information might be signaled by the co-scheduler 230 to the aggressor UE 281 using a configuration index or bit mask (e.g., 0=uplink subframe and 1=downlink or special subframe) of length 10-bits for a 10-bit repetitive TDD pattern or of length 5-bits for a 5-bit repetitive TDD pattern. Of course, other signaling systems and other bit lengths may be used depending on the implementation.

Using the second set of power values and the timing information, the aggressor UE 281 then modifies its transmission power during a time region U2 based on when the victim UE is nearby and expected to be receiving (e.g., during at least part of S subframes 642, 664 and during D subframes 660, 662). Thus, the interference 617 resulting when using power-dimensioned coexistence techniques is at a lower power relative to the non-mitigated interference 615. When the victim UE is expected to be transmitting (e.g., during subframes 650, 652, 670), the aggressor UE 281 may use the previous transmission power parameters (or other transmission power parameters) to transmit at a different power level during time region U1, which results in adjacent channel leakage 619 that is not experienced by the proximal victim UE2 as interference.

Thus, the co-scheduler partitions the victim UE2's downlink into multiple, non-overlapping time subsets, and the aggressor UE uses a different set of power values during each time subset U1, U2. The aggressor UE may implement multiple power loops—each power loop running separately for PUSCH, PUCCH, and SRS. Although the time subsets U1, U2 are shown in whole subframes, the subsets may be defined as portions of subframes (e.g., slots or half-subframes, LTE symbols, etc.). Although there are two time subsets U1, U2 shown in this example, more than two time subsets may be implemented and, consequently, more than two sets of power values and more than two power loops. In one instance, the aggressor UE's eNB can maintain the power control loop for region U1 identical to that in legacy systems such as LTE Rel-8/9/10. However, because legacy-valued power transmissions during region U2 are likely to de-sense TDD downlink reception at the victim UE2, the aggressor UE transmit power during region U2 can be set to a value smaller than the aggressor UE transmit power during region U1.

FIG. 7 shows a yet further example of a time and frequency graph for multi-radio coexistence using a second set of uplink power control parameters. Like FIGS. 3 and 5, adjacent frequency band 130 is implemented as an unpaired downlink frequency band (or band 130 could be the downlink band of a pair of FDD frequency bands). The x-axis 798 is time and the y-axis 799 is frequency. The example LTE subframes are 1 ms in duration and may use one or more frequency subcarriers within a frequency band to transmit the signals. A timing offset $T_O$ 797 indicates whether the subframes on each frequency band are synchronized ($T_O$=0) or not ($T_O \neq 0$). In this example, the timing offset is set to zero for the sake of simplicity.

As shown, a victim UE 282 is assigned downlink subframes 740, 742, 750 in frequency band 130 while an aggressor UE 281 is assigned uplink subframes 710, 712, 720, 722, 724, 726, 728, 730 in adjacent frequency band 110. Without mitigation techniques, the aggressor UE's transmissions during subframe 710 may cause significant interference 715 to a proximal victim UE's receptions in overlapping subframe 740.

When the co-scheduler 230 receives information indicating that there is a potential victim UE (e.g., that a UE 282 receiving in an adjacent band is proximal to a transmitting UE 281), the co-scheduler 230 provides a second set of power values to the aggressor UE 281. Alternately, the second set of power values could have been provided earlier to the aggressor UE and the co-scheduler instructs the aggressor UE on when to use the second set of power values. The co-scheduler 230 also provides UE2 downlink scheduling information (possibly including timing offset information) to the aggressor UE 281. In this example, the timing offset is zero and the victim UE 282 is scheduled to receive during subframes 742, 750. Among other possibilities, the UE2 downlink scheduling information may be signaled by the co-scheduler 230 to the aggressor UE 281 using a bit mask (e.g., 0=no downlink subframe scheduled and 1=downlink subframe scheduled) for a given number of subframes into the future.

The aggressor UE 281 then modifies its transmission power during region U2 based on the second set of power values when the victim UE is nearby and is expected to be receiving (e.g., during subframes 742, 750). Thus, the interference 717 resulting when using power-dimensioned coexistence techniques is at a lower power relative to the non-mitigated interference 715. When the victim UE is not expected to be receiving in the adjacent band 130 (e.g., during subframes 760, 762, 764, 766, 768), the aggressor UE 281 may use the previous transmission power parameters (or other transmission power parameters) to transmit at a different power level within time region U1, which results in adjacent channel leakage 719 that is not experienced by the victim UE as interference.

In more detail, the aggressor UE1 sets a PUSCH transmit power in time region U1 given by:

$$P_{PUSCH,loop1}(n) = \min \left\{ \begin{array}{c} P_{CMAX}(n), \\ 10\log_{10}(M_{PUSCH}(n)) + P_{O\_PUSCH,loop1} + \alpha_{loop1} \cdot PL + \\ \Delta_{TF,loop1}(i) + f_{loop1}(i) \end{array} \right\},$$

and a PUSCH transmit power during time region U2 given by:

$$P_{PUSCH,loop2}(n) = \min \left\{ \begin{array}{c} P_{CMAX}(n), \\ 10\log_{10}(M_{PUSCH}(n)) + P_{O\_PUSCH,loop2} + \\ \alpha_{loop2} \cdot PL + \Delta_{TF,loop2}(i) + f_{loop2}(i) \end{array} \right\}$$

where $P_{PUSCH,\ loop\ j}(n)$ is the PUSCH transmit power in uplink subframe n that belongs to region Uj (j=1, 2), $P_{CMAX}(n)$ is the configured maximum transmit power, $M_{PUSCH}(n)$ is the bandwidth of the PUSCH resource assignment in subframe n, $P_{O\_PUSCH,\ loop\ j}$ is the PUSCH power offset configured by higher layers, $\alpha_{loop\ j}$ is the fractional power control coefficient configured by higher layers, PL is the path loss associated with the eNB-UE link, $\Delta_{TF,\ loop\ j}(i)$ is the power control delta (associated with transmitting UCI [uplink control information] on an uplink shared channel (UL-SCH) configured by higher layers, and $f_{loop\ j}(i)$ is the power term when power control accumulation is enabled for subframe n when subframe n happens to be the i-th subframe since accumulation was reset.

In the above equations, i is the number of subframes over which power offsets derived from transmit power control (TPC) commands were accumulated. Therefore, $i=n-n_{RESET}$ where, $n_{RESET}$ is the subframe index of the subframe where power accumulation due to TPC commands was last reset. The TPC commands are transmitted in downlink control information (DCI) transported over PDCCH. The serving cell can transmit a TPC command applicable to loop 1 on subframe (n-k) where for example k=4 or k=6. In one embodiment, the TPC command is included in PDCCH with DCI format 0 for serving cell c or is jointly coded with other TPC commands in PDCCH with DCI format 3/3A whose CRC parity bits are scrambled with TPC-PUSCH-RNTI. The TPC command may include an indicator that signals which of the two power control loops, loop 1 or loop 2, the TPC command must be applied to. Upon receiving the TPC command, the UE applies the closed-loop power control update:

$$f_{loop\ j}(i) = f_{loop\ j}(i-1) + \delta_{PUSCH,loop\ j}(i-K_{PUSCH})$$

where $\delta_{PUSCH,\ loop\ j}$ is determined based on the TPC command applicable to loop j and $K_{PUSCH}$=4 or 6.

This concept is applicable to other uplink transmissions such as PUCCH, SRS, Demodulation Reference Signal (DM-RS), etc. Thus, similar equations can be written down for regions U1 and U2 for PUCCH, SRS, and DM-RS transmissions.

The aggressor UE1 computes a $P_{CMAX}$ applicable to subframe n based on whether or not there is a simultaneous transmission of PUSCH on another set of uplink resources, whether or not there is a simultaneous PUCCH or SRS transmission, whether or not there is power back off (denoted by "Maximum Power Reduction (MPR)" or "additional maximum power reduction (A-MPR)") associated with a higher order modulation (16 QAM, 64 QAM, 256 QAM), and/or the amount of out-of-band and spurious emissions.

Additionally, the aggressor UE1 may compute separate power headroom reports (PHRs) for regions U1 and U2 based on the U1 and U2 $P_{CMAX}$ values and the computed uplink transmit power, because the respective uplink transmit powers may be different:

$$PH_{loop\ 1}(n) = P_{CMAX}(n) - \{10 \log_{10}(M_{PUSCH}(n)) + P_{O\_PUSCH,loop\ 1} + \alpha_{loop\ 1} \cdot PL + \Delta_{TF,loop\ 1}(i) + f_{loop\ 1}(i)\}$$

$$PH_{loop\ 2}(n) = P_{CMAX}(n) - \{10 \log_{10}(M_{PUSCH}(n)) + P_{O\_PUSCH,loop\ 2} + \alpha_{loop\ 2} \cdot PL + \Delta_{TF,loop\ 2}(i)\}$$

PHRs for each loop may be triggered independently, and a single bit can distinguish between the PHRs of two loops. Also, the aggressor UE may use a lower modulation and coding scheme (MCS) during time region U2, which may help to compensate for the lower uplink transmission power.

In "virtual PHR reporting", an aggressor UE can be configured to compute and transmit PHR on a subframe for a given component carrier even when it is not transmitting PUSCH on that subframe in that component carrier. For the purpose of PHR computation, the UE 281 assumes a certain reference resource (an allocation of a certain size, RB start location, etc.) in its PHR computation.

Note that FIGS. 3-7 provide scenarios for mitigating interference when collocated or proximal UEs are operating in adjacent frequency bands. FIGS. 3-4 describe a frequency-and-time dimensioned mitigation, FIG. 5 describes another type of frequency-and-time dimensioned mitigation, and FIGS. 6-7 describe a power-and-time control dimensioned mitigation. These different types of mitigation can be used separately or in conjunction and independently applied to various physical channels (e.g., PDCCH, PUCCH, PDSCH, PUSCH, and SRS). The interference mitigation is managed by a co-scheduler 230 in cooperation with one or more of the collocated or proximal UEs.

A timing advance (TA) command that is decoded in a Medium Access Control (MAC) control element (CE) in subframe n can be applied by the UE in a UL transmission on subframe n+k where for example k=6. Therefore, it is possible that subframes (n+k−1) and (n+k) are partially overlapping. In case of a potential overlap, the UE may to truncate the transmission of the overlapping portion on either subframe (n+k−1) or subframe (n+k).

This above method of using two PC loops can be used to protect a second RAT such as UTRA, IEEE 802.11 (WiFi), Bluetooth (BT), etc. For example, the aggressor and the victim may be the same wireless terminal and in-device interference issue can arise where a LTE UL transmission may interfere with UTRA or WiFi reception. For example, in FIG. 6, subframes within power region U2 can be "reserved" for use by the victim technology. The interference during power region U2 from a potential LTE UL transmission can be mitigated by reducing transmit power on subframes within power region U2 by applying the above embodiment.

The two power control loops (i.e., loop 1 and loop 2) can be applied separately to each component carrier when multiple carriers are aggregated on the uplink. In principle, we could have two power control loops each per UL component carrier.

Figure 8:
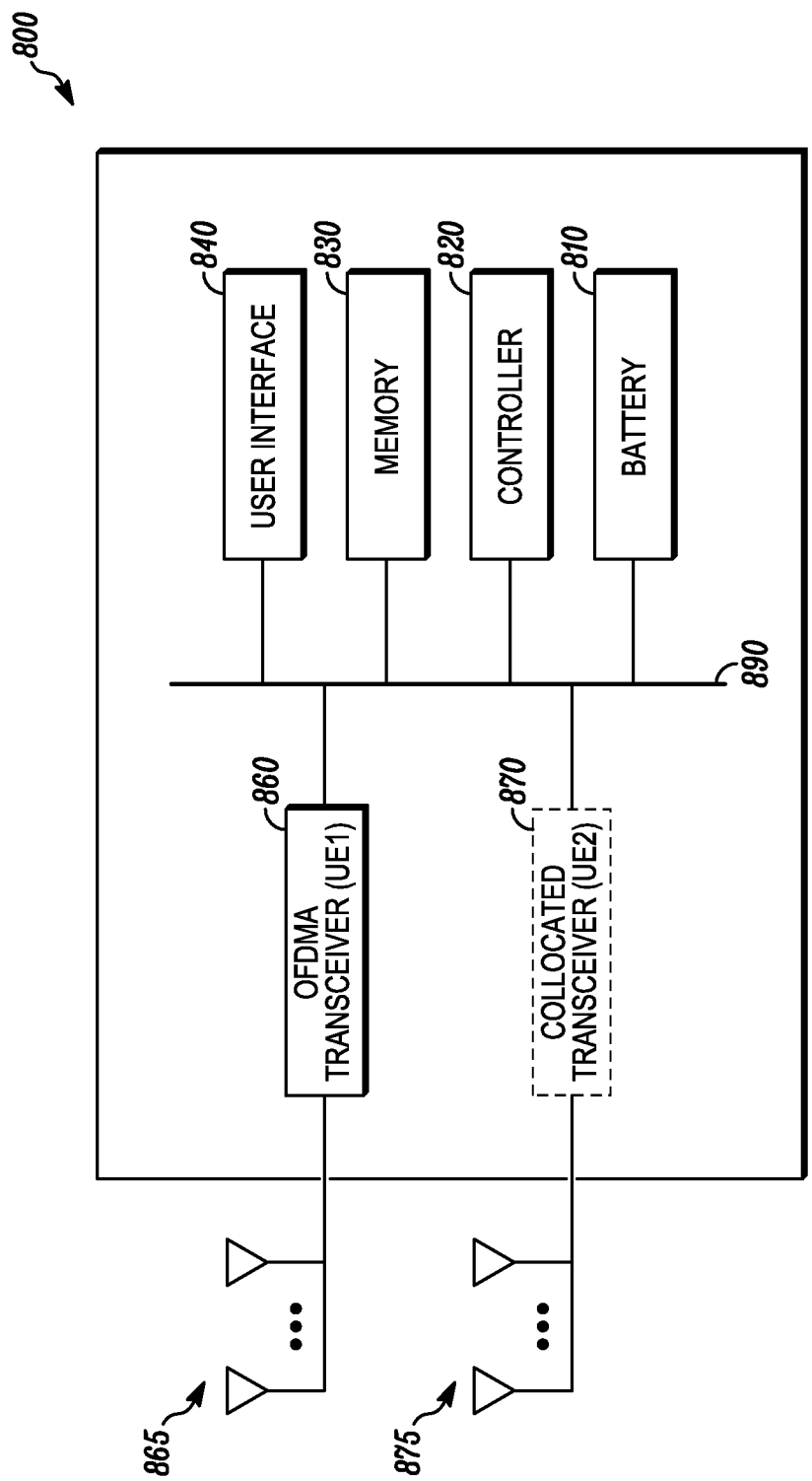
FIG. 8 shows an example block diagram of an orthogonal frequency division multiple access (OFDMA) user equipment with an optional collocated transceiver.

FIG. 8 shows an example block diagram of an orthogonal frequency division multiple access (OFDMA) user equipment 800 with an optional collocated transceiver 870. The user equipment could be the aggressor UE 281, the victim UE 282, a single mobile device containing collocated aggressor and victim UEs, or any other UE 283, 284 shown in FIG. 2. The UE block diagram is greatly simplified to focus only on details that are pertinent to multi-radio coexistence.

The UE 800 includes a battery 810 or other portable power source, a controller 820 for controlling the various components of the UE 800, and a memory 830 for storing programs and data for the UE 800 and its controller 820. The UE 800 also includes a user interface 840 including components such as a loudspeaker, a microphone, a keypad, and a display.

A first transceiver 860 is coupled to the other components through a bus 890. The first transceiver can be coupled to a multi-port or multi-antenna MIMO antenna system 865 for LTE signaling. Optionally, the UE can include a second transceiver 870 with a shared or secondary multi-antenna system 875 and also responsive to a specific radio technology or modulation type such as LTE, HSPA, or OFDMA. When two transceivers are within a single device, the first and second transceivers are collocated. If the transmitter of the first transceiver 860 is transmitting on a frequency that is adjacent to an operating frequency of the receiver of the second transceiver 870, interference is likely to result unless coexistence tactics are used. The controller 820 is aware of the uplink and downlink operational frequencies, transmission power parameters, and timing of both transceivers, and the controller 820 can direct the first transceiver 860 to inform its serving base station regarding the need for coexistence between the collocated transceivers.

Even if a victim transceiver is not collocated with an aggressor transceiver, the victim transceiver can provide location information (e.g., path loss, transmit power state, relative timing advance, angle of arrival (AoA), and/or GPS location) to its serving eNB, and that eNB can transfer the location information to the aggressor UE's eNB to determine the proximity of the aggressor UE to the victim UE.

The serving eNB may also deliver UE2 scheduling information and multiple sets of power control parameters to assist the UE in mitigating interference between UE1 and UE2. The scheduling information for both the UE1 and UE2 are determined by a co-scheduler 230 that is coupled to the serving eNB 210 of the aggressor UE 281 and to the serving eNB 220 of the victim UE 282. See FIG. 2.

Figure 9:
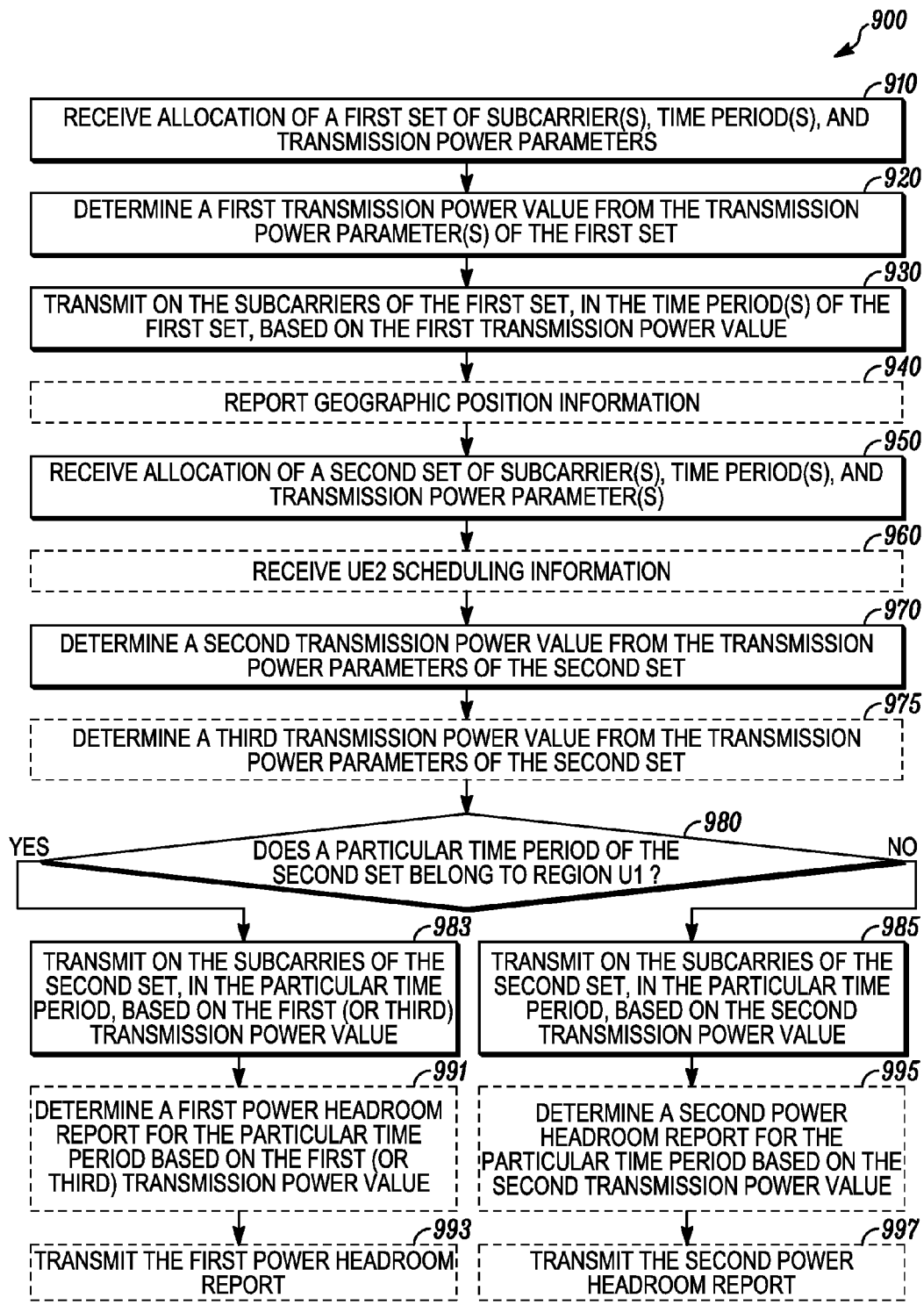
FIG. 9 shows an example flow diagram for a method for multi-radio coexistence at a user equipment such as an aggressor UE.

FIG. 9 shows an example flow diagram 900 for a method for multi-radio coexistence at a user equipment such as an aggressor UE. This flow diagram 900 may be implemented using the memory 830, controller 820, and OFDMA transceiver 860 components of the OFDMA user equipment 800 shown in FIG. 8.

Initially, the OFDMA user equipment receives 910 from its serving eNB an allocation of a first set of subcarrier(s), time periods(s), and transmission power parameter(s). LTE generally allocates more than one subcarrier on one or more subframes and uses multiple transmission power parameters, but other RATs may allocate these three elements in a slightly different manner. Next, the UE1 determines 920 a first transmission power value from the transmission power parameters and transmits 930 on the subcarrier(s) of the first set, in one or more time periods of the first set, based on the first transmission power value.

In this flow diagram, the UE1 optionally reports 940 geographic position information. This geographic position information can be obtained using a positioning receiver such as a GPS receiver or an Assisted-GPS receiver. This reporting step 940 may occur at a different sequence in the flow diagram (e.g., anytime prior to or during steps 910, 920, 930) or may be omitted. For example, this reporting step may be omitted when the aggressor UE's serving eNB can determine geographic position information.

This initial set of steps 910, 920, 930, 940 may repeat in accordance with standard wireless signaling procedures. If, in the wireless network infrastructure, the co-scheduler 230 has detected a proximal potential victim UE operating on an adjacent frequency band, it may take steps to mitigate interference between the UE1 transmissions and the UE2's adjacent frequency band receptions.

At this point, the UE1 receives 950 an allocation of a second set of subcarrier(s), time period(s), and transmission power parameter(s). This second set is similar to the first set; however, the second set takes into account a proximal UE2 operating on an adjacent frequency band. The UE1 may optionally receive 960 some UE2 scheduling information that may indicate when the UE2 is scheduled to receive on the adjacent frequency band.

Using the transmission power parameters from the second set, the UE1 determines 970 a second transmission power value. Optionally, the UE1 also determines 975 a third transmission power value from the transmission power parameters of the second set. If the transmission power parameters of the second set are dual transmission power parameters, then the calculation of a third transmission power value is appropriate.

Based on the allocation information from step 950 and/or the UE2 scheduling information from step 960, the UE1 determines 980 whether a particular time period (e.g., subframe or subframe portion) of the second set belongs to a region U1 as shown in FIGS. 6-7.

If the particular time period belongs to region U1, the UE1 transmits 983 on the subcarriers of the second set, during the particular time period, based on the first (or third) transmission power value. If there is no third transmission power value, then the UE1 transmits based on the first transmission power value previously determined in step 920. If the particular subframe does not belong to region U1 (e.g., the subframe belongs to region U2), the UE1 transmits 985 on the subcarriers of the second set, in the particular time period, based on the second transmission power value.

Optionally, the UE1 can determine separate power headroom reports for the separate regions U1, U2. The UE1 determines 991 a first power headroom report for the particular time period based on the first (or third) transmission power value and transmits 993 the first power headroom report to its serving base station. The UE1 determines 995 a second power headroom report for the particular time period based on the second transmission power value and transmits 997 the second power headroom report to the serving base station. Power headroom reports may be sent independently of each other and a bit-field may be added to each report to indicate whether the power headroom report applies to region U1 or region U2.

After transmitting on the time periods of the second set, the secondary set of steps 950, 960, 970, 975, 980, 983, 985, 991, 993, 995, 997 may repeat as long as the co-scheduler 230 detects a proximal potential victim UE operating on an adjacent frequency band and is directing the UE1 to help mitigate interference. The flow returns to step 910 when the UE1 no longer receives a set of subcarriers, time periods, and transmission power parameters that attempts to mitigate interference at a proximal victim UE because, for example, the co-scheduler has determined that there are no longer any nearby UEs receiving on an adjacent carrier frequency band.

In this manner, the UE1 complies with subcarrier, time period, and power instructions received from its serving eNB in order to mitigate interference to a proximally-located potential victim UE2 operating in an adjacent carrier frequency band.

Figure 10:
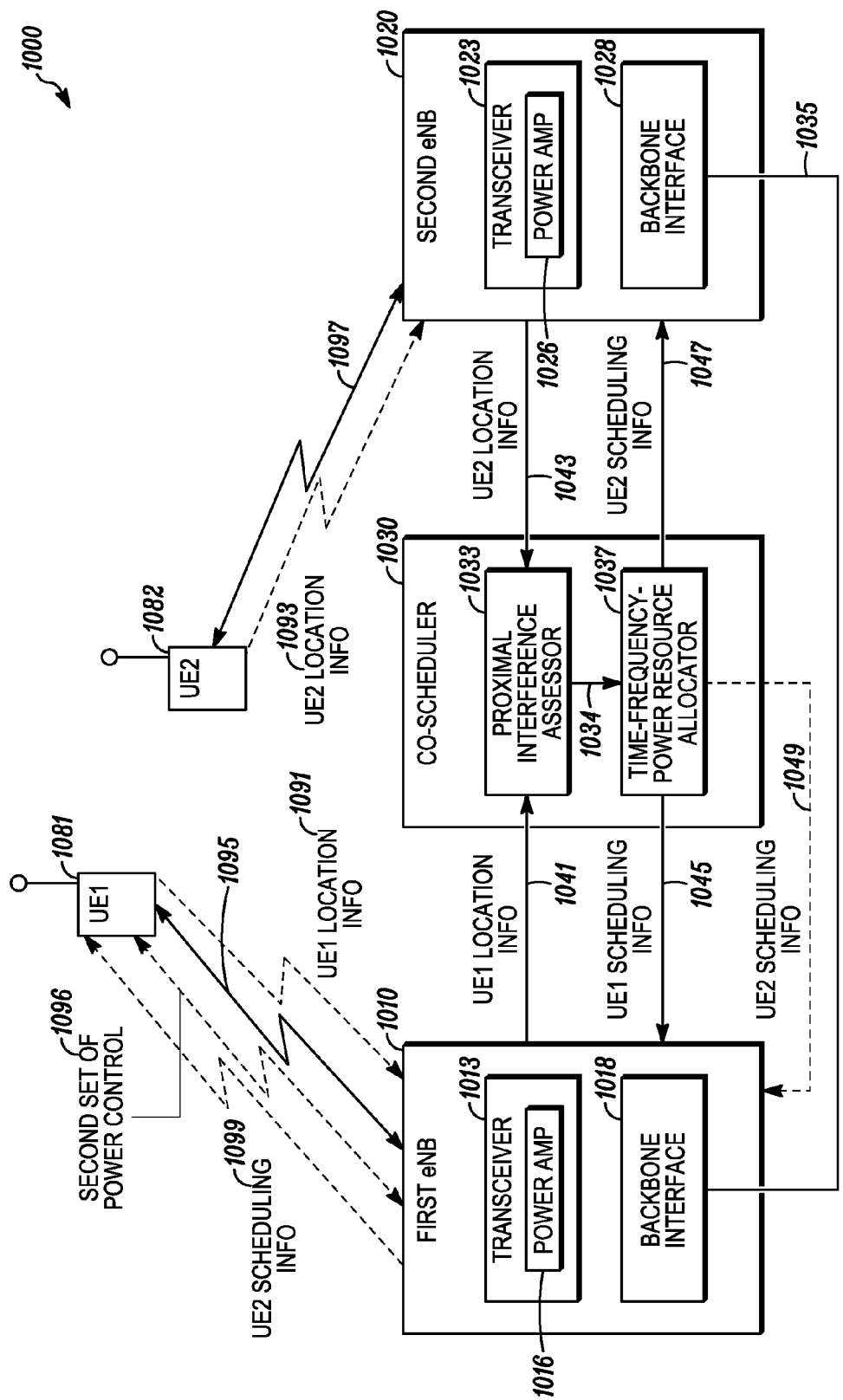
FIG. 10 shows an example block diagram of a co-scheduler for coordinating communications in power, time, and frequency between two orthogonal frequency division multiple access (OFDMA) base stations in accordance with an embodiment.

FIG. 10 shows an example block diagram 1000 of a co-scheduler for coordinating communications in time and frequency between two orthogonal frequency divisional multiple access (OFDMA) base stations 1010, 1020 in accordance with an embodiment. The base stations could be the FDD base station 210 and the unpaired system base station 220 shown in FIG. 2. Alternately, one or more of the base stations 1010, 1020 could be a different type of base station. The co-scheduler and base station block diagrams are greatly simplified to focus only on details that are pertinent to multi-radio coexistence.

Each base station 1010, 1020 includes a transceiver 1013, 1023 with a power amplifier 1016, 1026 and an antenna system (not shown) having multiple antennas. The base station may include multiple sectors, and/or multiple transceivers. The base stations serve an overlapping geographic area and operate on at least one adjacent frequency band. The transceivers 1013, 1023 are controlled in part by a co-scheduler 1030 that may be co-located with either base station, distributed within both base stations, or located outside of the base stations 1010, 1020 and coupled to the base stations. The base stations 1010, 1020 also have backbone interfaces 1018, 1028 that are coupled to the other base station serving an overlapping geographic area and operating on at least one adjacent frequency band. With a 3GPP LTE network, the backbone 1035 may be an X2 interface, a different type of standard interface, or a proprietary interface.

The co-scheduler 1030 includes a proximal interference assessor 1033 and a time-frequency-power resource allocator 1037. The proximal interference assessor 1033 receives first UE (e.g., aggressor UE1) location information 1041 from the first eNB 1010 and receives second UE (e.g., victim UE2) location information 1043 from the second eNB 1020. The UE location information can be generated within the UE itself (e.g., via stand-alone GPS) and transmitted 1091, 1093 to the serving eNB to relay to the co-scheduler 1030, can be generated with cooperation of the UE and the eNB (e.g., via assisted GPS and/or angle of arrival information and/or path loss, transmit power state, relative timing advance) and sent to the co-scheduler 1030, or can be produced by the eNB without the assistance of the UE (e.g., angle of arrival information and/or path loss, transmit power state, relative timing advance). Based on the location information 1041, 1043, the proximal interference assessor 1033 can determine whether the two UEs are proximal and the circumstances under which their downlink and uplink assignments are likely to cause interference.

The time-frequency-power resource allocator 1037 receives the time-frequency constraints from the proximal interference assessor 1033, which are based on the proximity information of the two UEs, and schedules UE1 wireless resources and UE2 wireless resources in a manner that mitigates proximal UE interference. For example, the time-frequency-power resource allocator 1037 may reduce the subcarriers assigned to one or both of the UEs during an overlapping time frame, may not assign certain sub-frames to one or both of the UEs, and/or may provide dual power control instructions to one or both of the UEs during certain symbols, slots, or subframes. These proximity constraints 1034 may be in addition to other, pre-existing scheduling constraints. The time-frequency-power resource allocator 1037 then sends the UE1 scheduling information 1045 to the UE1's serving base station 1010 and the UE2 scheduling information 1047 to the UE2's serving base station 1020. Based on the scheduling information, the base station transceivers 1013, 1023 and their respective power amplifiers 1016, 1026 are controlled to transmit and receive signaling and data.

Optionally, the time-frequency-power resource allocator 1037 can send UE2 scheduling information 1049 to the first eNB 1010. This information can be relayed 1099 to the UE1 1081 so that the UE1 can make decisions regarding whether to transmit and/or transmit power based on known UE2 scheduling information. This will be described in more detail later. Of course, standard uplink and downlink signaling and data 1095, 1097 are transmitted to and from each UE 1081, 1082 to its serving eNB 1010, 1020 in compliance with the assigned scheduling information. In addition to the standard power control parameters, a second set of power control parameters 1096 may be signaled from the first eNB 1010 to the UE1 1081, and the UE1 may provide a second set of headroom reports to the first eNB. These optional communications 1096, 1099 are applicable to implementations of coexistence that use UE2 timing information and/or power-control-dimensioned interference mitigation.

Regarding power control, the co-scheduler 1030 may configure a lower uplink transmit power in one or more proximal aggressor UEs during certain scheduled times. For example, within this embodiment, $P_{O\_PUSCH, loop\ 1}$ can be configured to be much lower than $P_{O\_PUSCH, loop\ 2}$ (i.e., back off power during region U2 relative to region U1) resulting in a less overall interference to the victim UE2's downlink subframes or subframe portions. For dynamically scheduled aggressor UE 1081 PUSCH transmissions, the co-scheduler 1030 can schedule a lower MCS in UL-SCH on subframes in region U2 to compensate for the reduced uplink transmit power. In cases of pre-configured transmissions such as SPS, periodic PUCCH, and SRS, the aggressor UE may implement some predetermined rules to compensate for the lower transmit power during region U2. For example, the aggressor UE may autonomously transmit using a lower MCS if SPS transmissions are ongoing. The aggressor UE may transmit using an alternate uplink control information (UCI) format with a higher code protection (i.e., lower code rate) during region U2.

The eNB-controlled $\Delta_{TF}$ and $\delta_{PUSCH}$ variables are separately signaled for the two power control loops of the aggressor UE implementing power-dimensioned interference mitigation techniques. In a further alternative, a maximum power reduction (MPR) or an additional maximum power reduction (A-MPR) can be signaled for either or both of the power control loops. To minimize signaling overhead, the MPR/A-MPR for the second loop can be signaled as an offset relative to the MPR/A-MPR for the first loop.

In another embodiment, only relatively few parameter offsets are signaled to establish the second power control loop. For example, an offset is signaled for one of: $P_{O\_PUSCH,c}(p)$, $PL_c$, $\Delta_{TF,c}(i)$. $P_{O\_PUSCH,c}(p)$ is a parameter composed of the sum of a component $P_{O\_NOMINAL\_PUSCH,c}(p)$ provided from higher layer signaling for p=0 and 1 and a component $P_{O\_UE\_PUSCH,c}(p)$ provided by higher layer signaling for p=0 and 1 for serving cell c. For PUSCH (re)transmissions corresponding to a semi-persistent grant then p=0, for PUSCH (re)transmissions corresponding to a dynamic scheduled grant then p=1, and for PUSCH (re)transmissions corresponding to the random access response grant then p=2. $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower ($P_{O\_PRE}$) and $\Delta_{PREAMBLE\_Msg3}$ are signaled from higher layers.

Pk is the downlink path loss estimate calculated by each UE for its serving cell c in dB. And $PL_c$=referenceSignalPower–higher layer filtered RSRP [reference signal received power], where referenceSignalPower is provided by higher layers, RSRP is defined in LTE technical specification 36.214 for the reference serving cell, and the higher layer filter configuration is defined in LTE technical specification 36.331 for the reference serving cell. Thus, measured RSRP is filtered by higher layers in the UE in accordance with LTE technical specifications. The serving cell chosen as the reference serving cell and used for determining referenceSignalPower and higher layer filtered RSRP is configured by the higher layer parameter pathlossReferenceLinking which is signaled from the serving base station. The case of multiple serving cells for a UE in LTE occurs for carrier aggregation where the UE is configured to be scheduled on more than one carrier (i.e., more than one serving cell where each serving cell may also be referred to as a TDD carrier or FDD carrier pair or as a component carrier) in a given subframe. Hence, for carrier aggregation, one of the serving cells must be chosen as the reference serving cell for power control purposes as described above. The offset to one of the power control parameters, which could be used to form a second power control loop, could be implemented for each serving cell such that each serving cell has a second power control loop. Alternately, the offset could be used for just one of the serving cells (e.g., the reference serving cell or a special serving cell called the primary serving cell). In the case of a single, primary serving cell, physical uplink control channel power control (PUCCH) is only supported on the primary serving cell.

The co-scheduler 1030 may enable this dual power control loop implementation in the aggressor UE 1081 when it detects that there are potential victim UEs in the vicinity of the aggressor UE (e.g., by geo-location, by a report or trigger generated by the victim UE 1082 or victim UE's serving eNB 1020, or by some other means).

When the proximal interference assessor 1033 receives updated location information 1041, 1043 indicating that the UEs are no longer proximal to each other, it may lift the proximity constraints from the time-frequency-power resource allocator 1037. Alternately, the proximity constraints 1034 may be set in place for a predetermined amount of time and expire—unless updated location information 1041, 1043 indicates that the predetermined amount of time needs to be reset.

Note that the proximal interference assessor 1033 is a logical function that may be incorporated as part of the time-frequency-power resource allocator 1037 or another part of the co-scheduler 1030. As mentioned previously, the co-scheduler 1030 can be implemented in a distributed fashion where part of the implementation resides in the aggressor UE's serving eNB 1010 and part of the implementation resides in the victim UE's serving eNB 1020 supported by inter-eNB signaling 1035.

In some power control coexistence implementations, the aggressor UE's eNB 1010 can back off aggressor UE uplink power during time region U2 based on some inter-eNB signaling 1035 triggers. For example, the victim UE 1082 can detect, measure, and report the presence of an aggressor UE 1081 and the associated interference level to its serving eNB

1020. The victim UE's serving eNB 1010 can relay this report to the aggressor UE's serving eNB 1010 along with some UE2 timing information (e.g., subframe and/or frame timing). The aggressor eNB 1010 can then use this report to modify the uplink power control loop applicable to region U2 to protect the D and S subframes of proximal TDD victim UEs and the PDSCH of proximal FDD victim UEs. This way, power back off during time region U2 is applied by the aggressor eNB 1081 only when there are adjacent carrier frequency band victim UEs 1081 receiving in the vicinity of an aggressor UE.

In the limit, the eNB 1010 associated with the aggressor UE 1081 could simply avoid scheduling aggressor UE transmissions in the subframes corresponding to some or all of the downlink subframes associated with the victim UE either by explicit signaling or by signaling the appropriate $P_{O\_PUSCH, loop\ j}$ value (say, set to "negative infinity") which effectively suspends the uplink transmissions on subframes during region Uj.

In the power control loop embodiments described, there can be a switch between the two different open loop power levels depending on whether the aggressor UE's transmission and the victim UE's reception are scheduled for a given subframe. An indicator, or even a single bit, can be used in the grant to explicitly specify one of two open loop power levels on the uplink. Alternately, given the victim UE's scheduling information, the aggressor UE can select between the two or more sets of transmission power control parameters based on the region (U1 or U2) during which it is transmitting. The uplink power levels can be reduced on specific subframes (e.g., during region U2) with potentially small performance losses.

The transmission power levels on the uplink (aggressor) channel or the power level difference between the uplink (aggressor) and downlink (victim) channels can be reduced to help alleviate the desensing caused by the uplink and downlink channels. This can be implemented by the serving base station signaling an energy per resource element (EPRE) setting applicable to a set of resource elements where the resource elements are part of the subcarriers being used for uplink transmission. An indicator can be used on the uplink scheduling grant to set the uplink power values during the regions U2. For example, the indicator can be an enhanced Transmission Power Setting (TPS) that is signaled to the aggressor UE in addition to a legacy transmission power control command through the downlink control information (DCI). The TPS could be a one-bit field that explicitly requests the UE to select a particular one of the two open loop uplink power levels. The TPS indicator could be a transmission power control (TPC) command to modify the power states of the UE for a region U2 in addition to (or in place of) higher-layer signaling in either of the previously presented embodiments.

Figure 11:
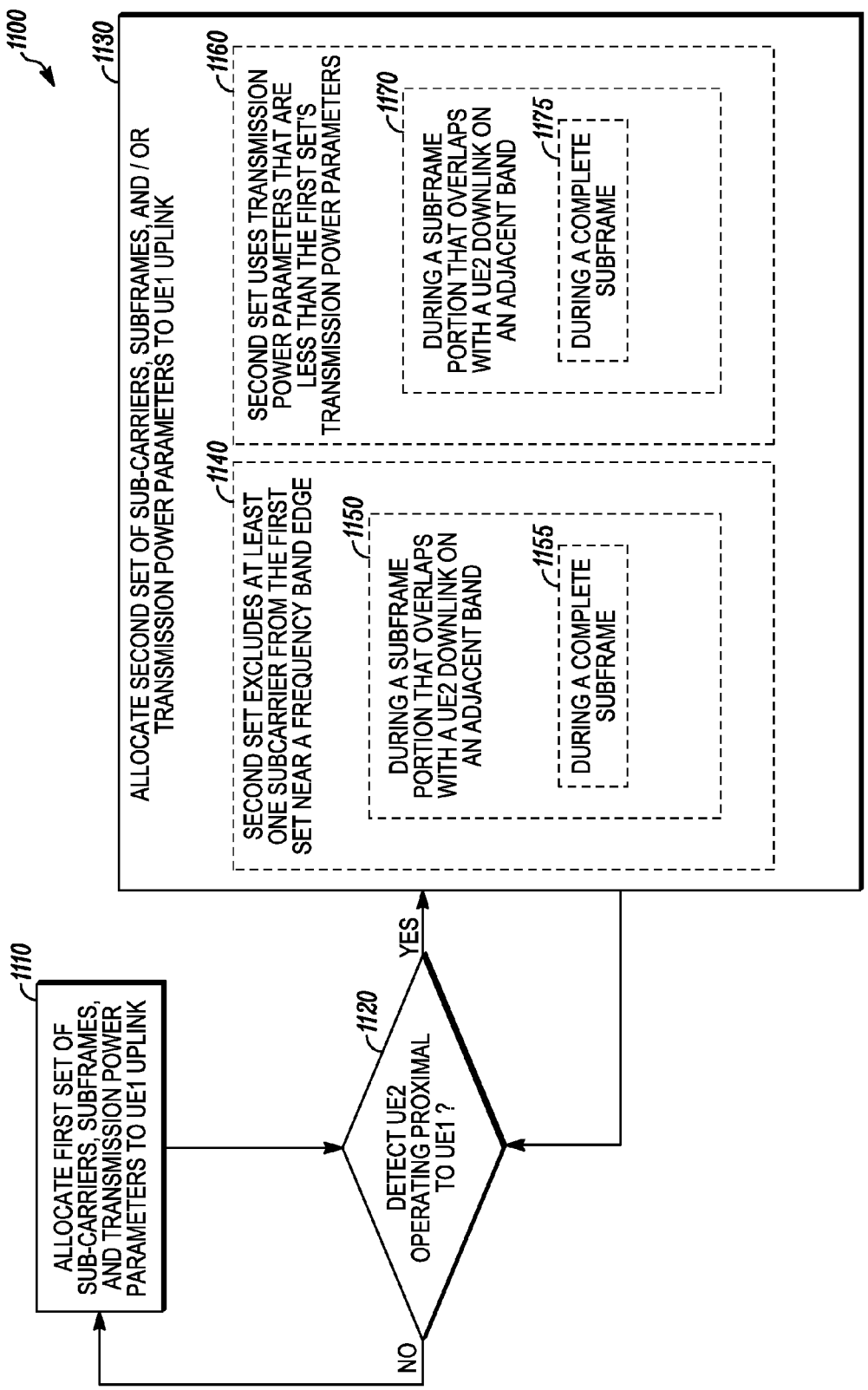
FIG. 11 shows an example flow diagram for a method for multi-radio coexistence at a co-scheduler.

FIG. 11 shows an example flow diagram 1100 for a method for multi-radio coexistence at a co-scheduler, such as the co-scheduler 1030 in FIG. 10, when proximal UEs, such as aggressor UE 1081 and victim UE 1082 in FIG. 10, are expected to experience adjacent channel interference. In general, the co-scheduler 1030 controlling both base stations 1010, 1020 will jointly assess the traffic that is available to be scheduled for transmission by both the paired frequency band eNB 1010 and the unpaired frequency band eNB 1020, and by taking into account the possibility for mutual interference between the proximal first and second UEs, the co-scheduler 1030 will modify its scheduling strategy. In one embodiment, the co-scheduler is scheduling and assigning resources for mobile stations via their respective serving base stations that belong to different RATs. In this case, the scheduler must address differences in time and frequency of the resource allocation used for each RAT in determining how to mitigate adjacent channel interference.

In another embodiment (that may be used in conjunction with the time-and-frequency allocation embodiment), the scheduler directs the eNB to use power control techniques to mitigate adjacent channel interference. For example, using teachings from the above embodiments, the power levels of subcarriers within a frequency span for a subframe can be adjusted. This can be implemented by the serving base station signaling an energy per resource element (EPRE) setting applicable to a set of resource elements where the resource elements are part of the subcarriers being used for uplink transmission.

Initially, the co-scheduler 1030 allocates 1110 a first set of subcarriers to the uplink channel of a first UE 1081. This allocation does not contemplate any adjacent channel interference restrictions in either time or frequency. Of course, other restrictions may exist based on network loading, the number of UEs being served by the eNB, etc. Because this UE1 is allocated transmission frequencies, it is considered a potential aggressor UE 281.

Next, the co-scheduler 1030 detects 1120 whether another UE is operating proximal to the aggressor UE 281. This detection function can be performed by the proximal interference assessor 1033 shown in FIG. 10. A detection of a proximal victim UE may occur through information sent through a backbone interface of the eNBs serving the aggressor and victim UEs. The UE2 may have a downlink channel that is adjacent to the uplink channel of the aggressor UE and thus may experience interference from the aggressor UE's transmissions. Thus, this second UE is considered a potential victim UE 282. If there is no potential victim UE detected, the flow returns to step 1110 and the eNB continues to assign uplink channels to the aggressor UE without adjacent channel interference restrictions.

If a potential victim UE is detected 1120, the co-scheduler allocates 1130 a second set of subcarriers, subframes, or transmission power parameters to the aggressor UE uplink channel. For example, the second set 1140 excludes a subcarrier from the first set that was nearest the adjacent frequency band. By reducing transmissions by the UE near the frequency band edge, adjacent channel interference can be mitigated in the adjacent band, and the potential victim UE may be able to properly receive signals on its downlink. As another example, the second set 1160 results in a lower transmission power of the aggressor UE. Optionally, if the eNB is aware of which of the potential victim UE's reception subframes will overlap with the aggressor UE's transmission subframes, the second set can be limited 1150, 1170 to only those subframe portions (i.e., less than a complete subframe) that will potentially cause adjacent channel interference. This technique may be used to prevent interference with a PDCCH scheduled for the victim UE. Still further, the reduced set of subcarriers can be limited 1155, 1175 to complete subframes that will interfere with reception in the adjacent band by the victim UE.

The flow returns to step 1120 to check whether the potential victim UE is still proximal to the aggressor UE. If the potential victim UE is still nearby, the co-scheduler 1030 allocates 1130 another second set to the aggressor UE. Note that each "second set" of step 1130 does not need to mimic any previous "second set" of step 1130. For example, see FIG. 3 where the "second set" subcarrier allocations changes from one subframe 320, 321 to the next. Additionally, although the various dimensions of frequency-and-time and power-andtime are separately described with respect to FIGS. 3-7, these dimensions can be used in any combination. Thus, mitigation in frequency-and-power-and-time is contemplated, and the time units may be in subframes or portions of subframes.

When the potential victim UE is no longer near the aggressor UE, the co-scheduler returns to allocating 1110 an uplink channel for the aggressor UE without regard to potential adjacent channel interference, and thus the entire frequency band and standard power control is available to allocate to the aggressor UE.

Figure 12:
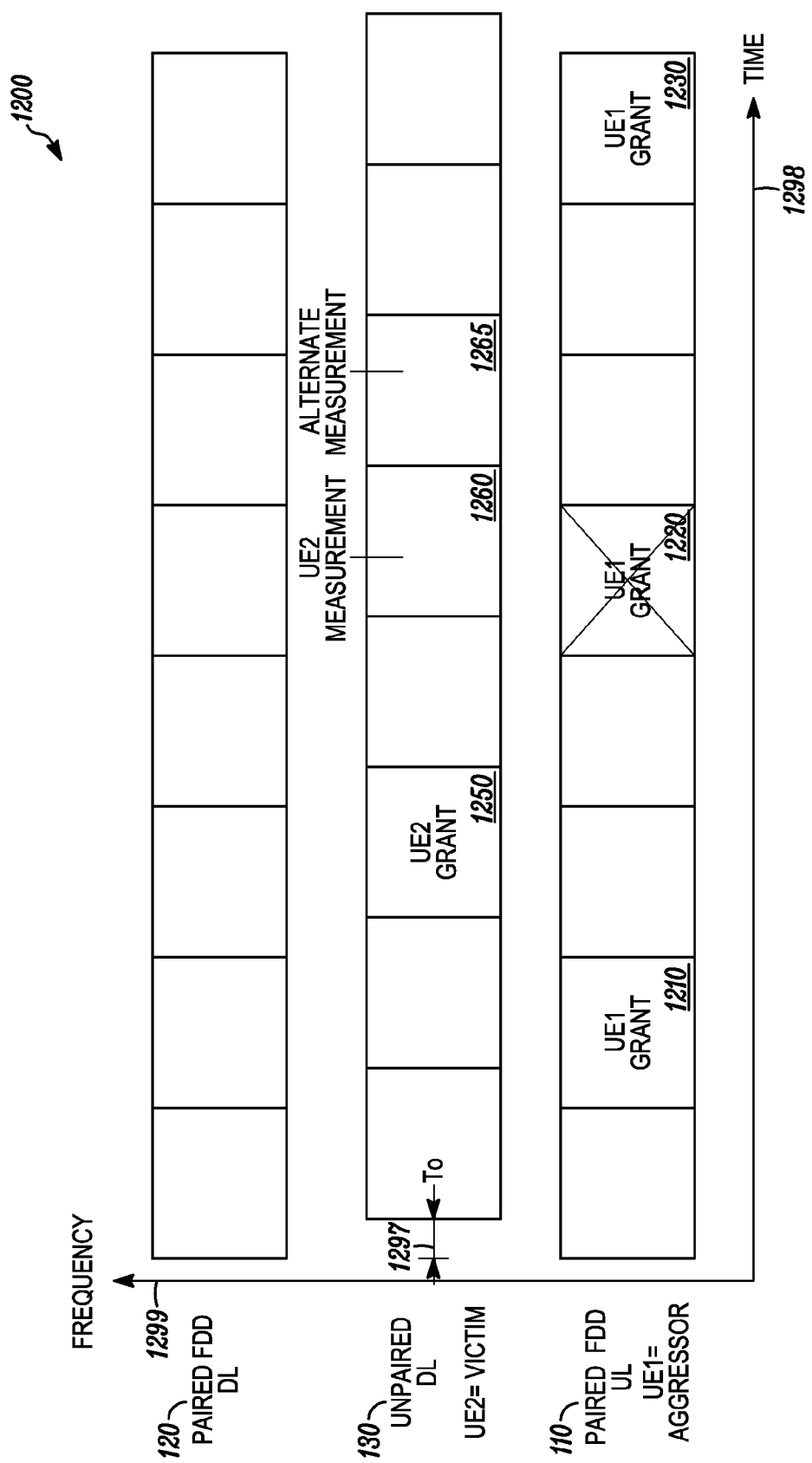
FIG. 12 shows an example of a time and frequency graph for multi-radio coexistence for channel measurements.

FIG. 12 shows an example of a time and frequency graph for multi-radio coexistence for channel measurements such as Radio Resource Management (RRM) and/or Radio Link Management (RLM) measurements. In this example, the x-axis 1298 represents time and the y-axis represents frequency 1299. A timing offset 1297 may be non-zero (as shown) or sub-frame aligned (where $T_O$=0). Initially, a potential aggressor UE 281 is given a semi-persistent uplink grant at subframes 1210, 1220, 1230. Although the aggressor UE's uplink subframes 1210, 1220, 1230 do not create interference for a proximal victim UE's downlink grant on subframe 1250, aggressor UE transmissions during subframe 1220 may cause interference during a victim UE's measurement occasion 1260. In this situation, a potential aggressor UE 281 does not transmit during a particular assigned uplink subframe 1220 that overlaps with the victim UE's measurement occasion 1260. This allows the victim UE 282 taking RRM and/or RLM measurements during subframe 1260 in an adjacent band to obtain measurement metrics without interference from the nearby aggressor UE 281.

A co-scheduler 1030 can instruct the aggressor UE 281 to not transmit during subframe 1220, the aggressor UE 281 can decide autonomously to not transmit during subframe 1220, or both approaches may be combined. Note that, technically, a transmitter is considered to be "not transmitting" when its transmit power is below an off-level threshold, which is usually −50 dBm for LTE systems. In a situation where the co-scheduler 1030 instructs the aggressor UE 281 to not transmit during a particular subframe, the co-scheduler 1030 instructs the aggressor UE 281 to not transmit during subframe 1220 based on measurement gaps also scheduled by the co-scheduler for victim UE 1082. An exception to the semi-persistent scheduling can be transmitted to the aggressor UE's eNB along with the UE1 scheduling information 1045.

If the aggressor UE 281 decides by itself to not transmit during subframe 1220, it is because the UE2 scheduling information 1049 sent to the aggressor UE's eNB includes measurement gap information, which is then transmitted 1099 to the aggressor UE. Using its own scheduling information and the measurement gap scheduling information of the victim UE, the aggressor UE can determine that a particular semi-persistent uplink subframe 1220 conflicts with a victim UE measurement gap 1260 and can avoid transmitting on that particular uplink subframe. If the aggressor UE 281 makes an autonomous decision, the aggressor UE 281 will receive a NACK from its serving base station 1010 indicating that PUSCH data was not received (due to the fact that no PUSCH data was transmitted during that subframe 1220), and succeeding transmissions in future subframes 1230 will provide opportunities for transmission of PUSCH data. Note that the aggressor UE, for any particular sub-frame, can decide either to transmit or not-transmit on a particular semi-persistent uplink subframe that is predicted to interfere with measurements at the victim UE 1082.

Yet another variation involves the co-scheduler 1030 transmitting both UE1 scheduling information 1045 and UE2 scheduling information 1049 to the aggressor UE's eNB for further transmission 1099 to the aggressor UE 1081 along with instructions for the aggressor UE 1081 to not transmit on scheduled semi-persistent uplink sub-frames that overlap with UE2 measurement gaps. In that situation, the aggressor UE makes it own decision to not transmit during semi-persistently scheduled uplink sub-frames 1220 that overlap a victim UE's measurement gaps 1260, but this decision is formulaic and the eNB 1010 can also make the same predictions. Thus, when no PUSCH data is received from a particular uplink sub-frame 1220 that is predicted to interfere with measurement gaps 1260 at the victim UE 1082, the eNB 1010 may choose to not transmit a NACK.

When the victim UE 1082 is no longer proximal to the aggressor UE 1081, as determined by the proximal interference assessor 1033, the co-scheduler 1030 can stop transmitting UE2 scheduling information 1049 with measurement gap information and/or specific instructions to not-transmit on a particular semi-persistently scheduled uplink sub-frame. Thus, a co-scheduler 1030 may also help reduce interference during a victim UE's measurement gaps in addition to (or instead of) helping to reduce interference during a victim UE's downlink sub-frames.

Figure 13:
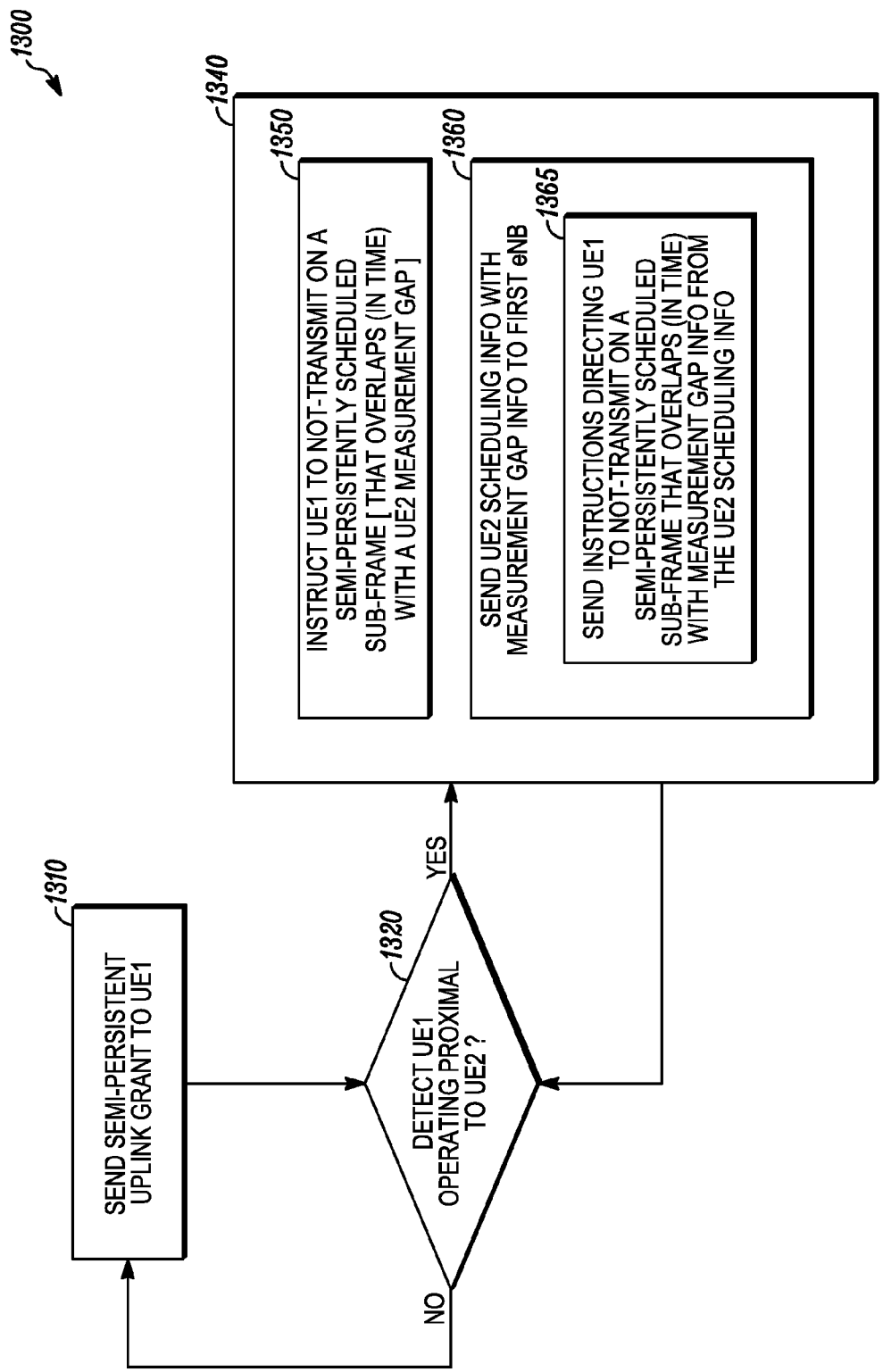
FIG. 13 shows an example flow diagram at a co-scheduler for a method for multi-radio coexistence during channel measurements.

FIG. 13 shows an example flow diagram 1300 at a co-scheduler for a method for multi-radio coexistence during channel measurements. This flow diagram 1300 may be implemented at a co-scheduler, such as the co-scheduler 1030 shown in FIG. 10. Initially, the co-scheduler sends 1310 a semi-persistent uplink grant to a first UE. Next, the co-scheduler checks 1320 whether the first UE (an aggressor UE) is operating proximal to a second UE (a potential victim UE) on an adjacent band. If there is no potential victim UE near to the aggressor UE, then the flow returns to checking 1320 (perhaps after a waiting period, which is not shown).

If a second UE is operating proximal to the first UE, the co-scheduler can take one of several coexistence actions 1340. As a first option, the co-scheduler may simply instruct 1350 the first UE to not-transmit one or more periodic uplink transmissions (or not-transmit all uplink transmissions) on a semi-persistently scheduled uplink sub-frame that overlaps (in time) with a RRM/RLM or other type of channel measurement by the victim UE 282 on an adjacent band. Because the co-scheduler assigns measurement gaps for the second UE, it can decide when to cancel part or all of a particular semi-persistently scheduled uplink sub-frame.

Another option is to send 1360 the victim UE's scheduling information including measurement gap information to the first eNB. The first eNB then transmits at least the measurement gap information to the aggressor UE so that the aggressor UE can autonomously decide whether to not transmit one or more periodic uplink transmissions during a particular semi-persistently scheduled uplink sub-frame or mute an entire semi-persistently scheduled uplink sub-frame. During this option, the aggressor UE's eNB does not know when the aggressor UE may choose to mute a persistently scheduled uplink sub-frame and will transmit a NACK to the aggressor UE in response to not-receiving a particular uplink sub-frame.

In addition to sending 1360 the victim UE's measurement gap information to the first eNB, the co-scheduler may also send instructions 1365 directing the aggressor UE to not-transmit one or more periodic uplink transmissions or mute a semi-persistently scheduled uplink sub-frame that overlaps (in time) with a measurement gap of the second UE. Thus, although the aggressor UE determines which semi-persistently scheduled uplink sub-frames to reduce or mute, this timing can also be determined by the aggressor UE's eNB. In this manner, the aggressor UE's eNB can avoid transmitting a NACK for a muted semi-persistently scheduled uplink subframe.

The flow returns to step 1320, possibly after a waiting period, to detect whether the two UEs are still proximal to each other. Note that the aggressor UE may be proximal to more than one victim UE and the coexistence methods may be tailored to the specific combination of aggressor and victim UEs as known by the co-scheduler.

As alluded to earlier, an alternative to suspending all uplink transmissions in a semi-persistently granted subframe 1220 is to suspend one or more periodic uplink transmissions in a granted subframe 1220. Period uplink transmissions include Physical Uplink Control Channel (PUCCH), Sounding Reference Signal (SRS), and Uplink Shared Channel (UL-SCH) carrying semi-persistently scheduled transmissions. This allows the PUSCH data to be transmitted but provides less interference when the victim UE 282 is taking measurements in overlapping subframe 1260 on an adjacent band 130.

Yet another alternative is to schedule measurement gaps for victim UEs to reduce overlapping transmissions from nearby transmitting UEs. Depending on the uplink channel assignments to the aggressor UE, this may be quite feasible if there is a small number of potential aggressor UEs. For example, if the aggressor UEs were assigned uplink grants during subframes 1210, 1220, and 1230, the co-scheduler could schedule a measurement gap for a victim UE anytime during subframe 1265 on the adjacent band 130.

Figure 14:
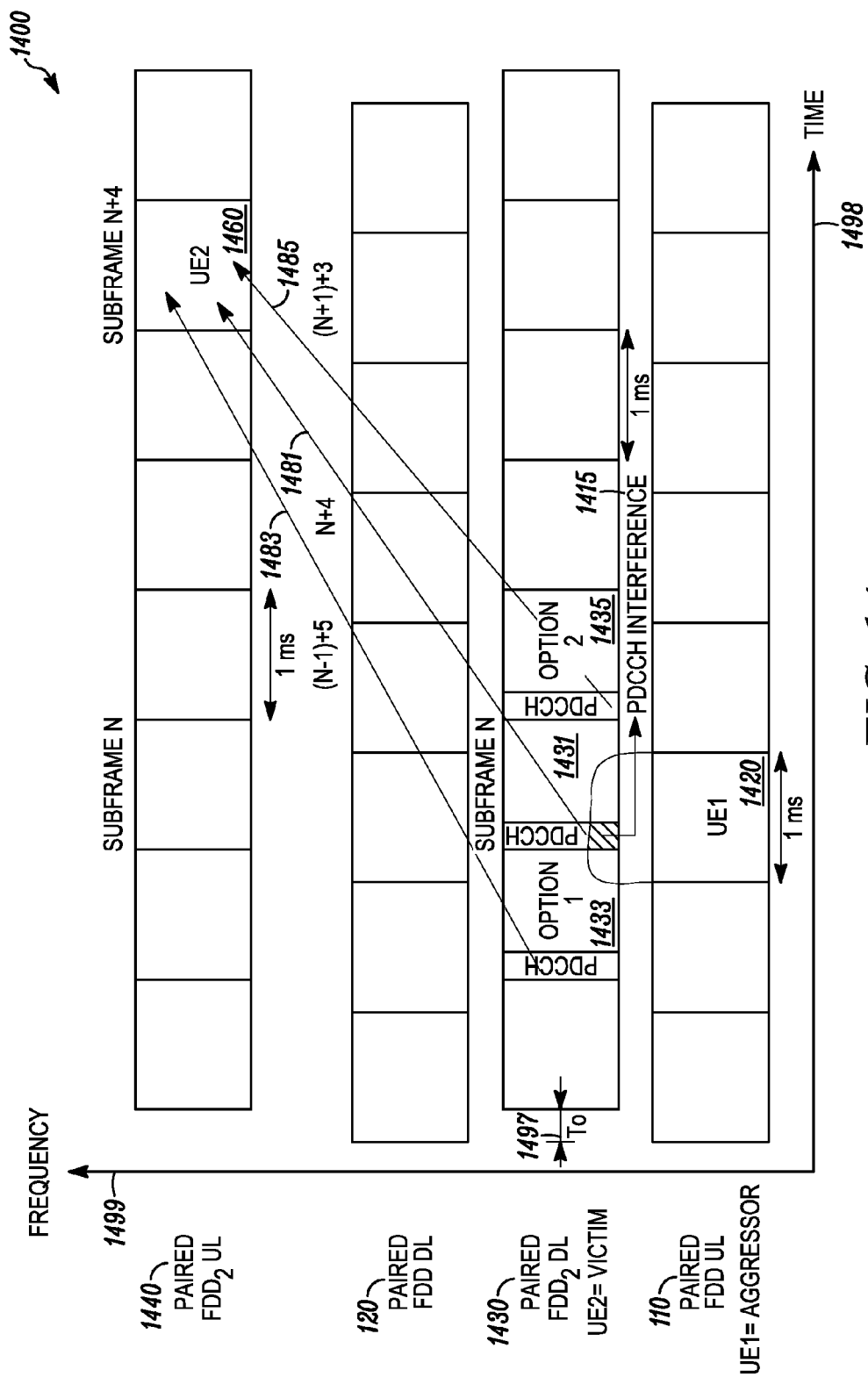
FIG. 14 shows a further example of a time and frequency graph for multi-radio coexistence.

FIG. 14 shows a further example of a time and frequency graph for multi-radio coexistence. In contrast to FIGS. 3, 5, and 12, the middle frequency band 1430 is a paired downlink with a corresponding FDD uplink 1440. In this situation, PDCCH interference 1415 occurs when an aggressor UE transmits on the FDD uplink band 110 (e.g., during subframe 1420) while the victim UE is receiving in the downlink band 1430 (e.g., during subframe 1431). The x-axis 1498 is time and the y-axis 1499 is frequency, and the subframes on the first FDD pair of bands 110, 120 are not aligned with the subframes of the second FDD pair of bands 1430, 1440 as shown by the non-zero timing offset 1497.

As described previously, Physical Downlink Control Channel (PDCCH) resources and reference symbols (such as a cell-specific reference symbol) are transmitted by a serving eNB 220 during the first few (1-3) symbols of a subframe. (Cell-specific reference symbols are transmitted in symbols 1 and 2, but are also transmitted in other symbols in the subframe.) The PDCCH instructs its served UEs (e.g., victim UE 282) regarding its time and frequency allocation for the current downlink subframe on a Physical Downlink Shared Channel (PDSCH) and for a future uplink subframe on a Physical Uplink Shared Channel (PUSCH). If the PDCCH is not properly decoded, the victim UE 282 will have difficulty obtaining its physical channel data on the PDSCH and, due to a failure to decode the uplink grant, will not transmit its physical channel data on the future PUSCH.

Usually, the PDCCH (at subframe n) includes uplink transmission grant information for a PUSCH four sub-frames 1460 into the future (at subframe n+4). If the PDCCH is not properly decoded due to PDCCH interference 1415, the PUSCH sub-frame 1460 will be wasted because the victim UE is unaware that the PUSCH has been granted during that subframe 1460 and therefore will not transmit during that sub-frame 1460.

The co-scheduler 1030 may be aware that the aggressor UE 281 may cause PDCCH interference 1415 on a certain victim UE subframe 1431. This information can be used to mitigate interference in time and/or frequency per FIG. 5, or the conflict information may be used to help the victim UE's eNB shift the PDCCH 1431 assigning the PUSCH subframe 1460 to a subframe 1433, 1435 that is less likely to experience interference from a proximally-located aggressor UE 281.

If the PDCCH assignment shifts to a different subframe 1433, 1435, the PDCCH uplink transmission grants will no longer be transmitted four subframes 1481 prior to the granted PUSCH subframe 1460. Instead, the granted PUSCH subframe 1460 may be five subframes 1483 after the PDCCH assignment or three subframes 1485 after the PDCCH assignment. Although the PDCCH assignment shift is shown as +/−one subframe, more significant shifts are possible. In order to signal the PDCCH assignment shift, the victim UE's eNB may transmit an indicator, referred to here as a Scheduling Delay Index (SDI), to advance or delay an uplink PUSCH grant relative to the PDCCH uplink transmission grant.

Figure 15:
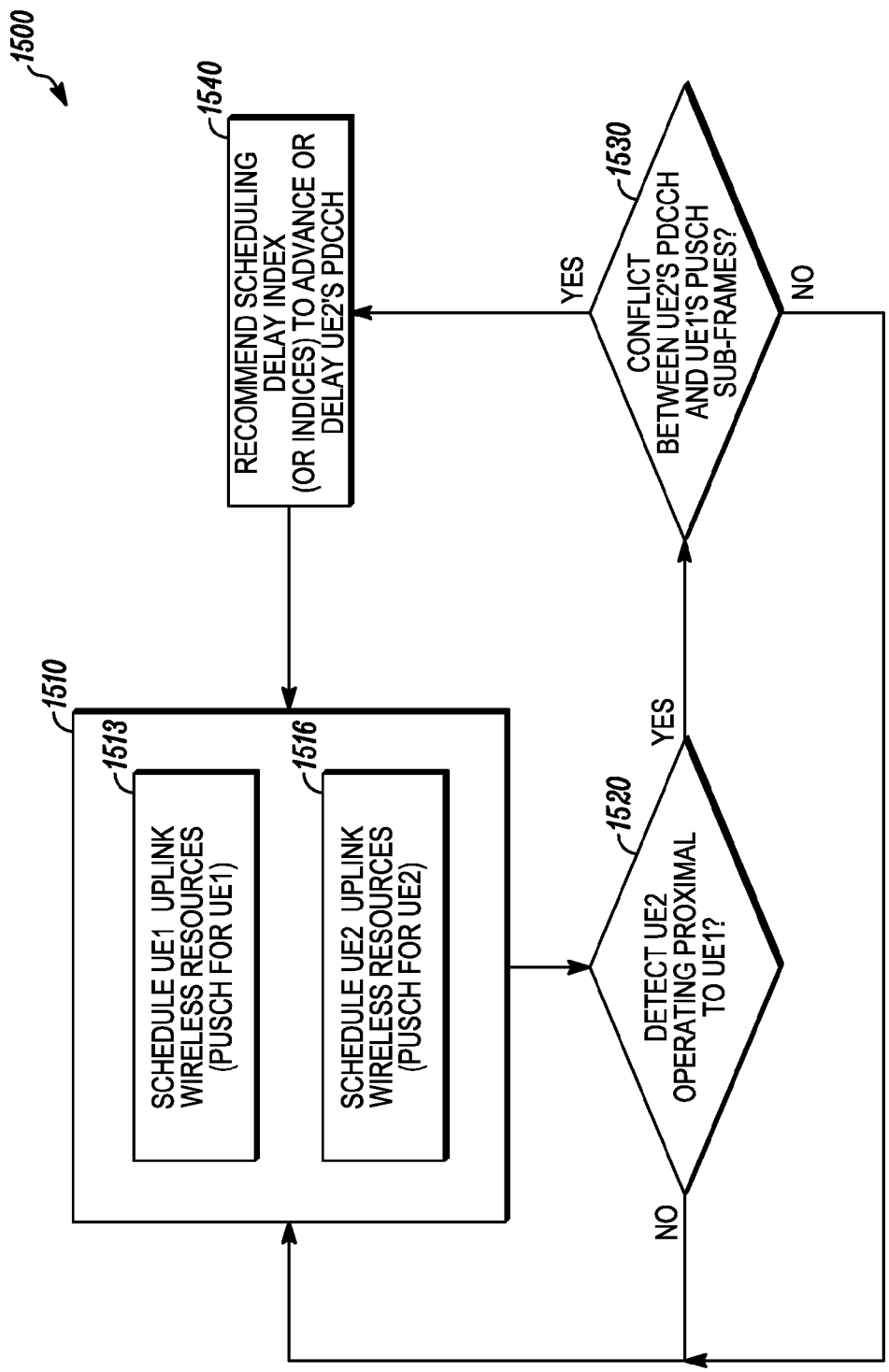
FIG. 15 shows an example flow diagram for a method for multi-radio coexistence using a scheduling delay index.

FIG. 15 shows an example flow diagram 1500 for a method for multi-radio coexistence using a scheduling delay index. In this flow diagram, a co-scheduler looks for conflicts between a victim UE's PDCCH grant of uplink resources and an adjacent-band aggressor UE's uplink transmissions.

Initially, the co-scheduler schedules 1510 uplink wireless resources for all UEs that it controls. Specifically, the co-scheduler schedules 1513 uplink resources to a potential aggressor UE such as UE 281 operating on paired FDD uplink frequency band 110. Also, the co-scheduler schedules 1516 uplink resources to a potential victim UE operating in an adjacent frequency band such as UE 282 operating in FDD downlink band 1430 shown in FIG. 14.

Next, the co-scheduler detects 1520 whether the UE1 and UE2 are operating proximal to each other. If the UEs are not proximal to one another, the flow returns to scheduling 1510 without regard to proximal-UE interference. If the UEs are proximal to each other, the co-scheduler looks for conflicts 1530 between the PDCCH grant of UE2 and the aggressor UE1's uplink wireless resource grants. As mentioned previously, a standard PDCCH uplink assignment will occur four subframes prior to the corresponding uplink PUSCH subframe.

If the co-scheduler predicts 1530 no conflict between the UE2's PDCCH reception and a proximal aggressor UE1's uplink transmissions, the flow returns to scheduling 1510. If there is a foreseeable conflict 1530, the co-scheduler recommends 1540 a scheduling delay index (or indices) to the victim UE's eNB to advance or delay the victim UE's PDCCH signaling that provides uplink transmission grants for a future PUSCH by that victim UE. The eNB may choose any one of the suggested SDIs, encode the victim UE's future PUSCH assignment in a PDCCH to the victim UE, and transmit the shifted PDCCH along with the SDI to the victim UE. Alternately, the eNB may not shift the PDCCH and risk potential interference by an adjacent aggressor UE.

The flow then returns to scheduling 1510 UE1 and UE2 uplink wireless resources and checking 1520 for proximal UEs that may interfere with each other. This method mitigates PDCCH interference by shifting the PDCCH assignment of an uplink wireless resource to reduce interference from a proximal aggressor UE's uplink transmission. Because the PDCCH assignment is shifted to a different subframe, a SDI is used to inform the victim UE that the PUSCH grant has moved to a different subframe relative to the PDCCH assignment subframe. Thus, the PDCCH assignment subframe, which is usually four subframes prior to the PUSCH grant, is no longer four subframes ahead; and the SDI indicates how the PDCCH assignment subframe has moved.

Because PDCCH is sent every subframe, the interfered-with PDCCH in subframe 1431 will no longer contain information vital to the PUSCH grant in subframe 1460. Thus, by moving (advancing or delaying) a PDCCH transmission to a victim UE from a regularly-scheduled subframe (e.g., subframe n 1431) that is forecasted to be subject to adjacent channel interference by a proximal aggressor UE to a subframe (e.g., subframe n−1 1433 or subframe n+1 1435) that is not expected to experience this interference, the PDCCH can benefit from coexistence techniques in the situation of adjacent channel interference caused by the proximity of an aggressor UE.

Thus, a co-scheduler may control an aggressor UE in transmission power, time, and frequency to mitigate UE-to-UE adjacent carrier system interference when a victim UE is receiving nearby. By complying with the transmission power, time, and frequency parameters as directed by the co-scheduler, the aggressor UE may reduce desense of the proximal victim UE's receiver. The co-scheduler can also compensate for some of the spectrum inefficiencies caused by the interference mitigation by intelligent scheduling of several UEs, some being proximal to the victim UE and others being distant from the victim UE. Meanwhile, the aggressor UE may implement two power control loops to reduce interference when a victim UE is receiving (or taking channel measurements) versus when the victim UE is transmitting.

While this disclosure includes what are considered presently to be the embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued.

For example, although LTE systems have been described in detail, teachings from this specification may be applied to TDMA/GSM systems, other OFDMA systems, and other wireless access technologies. Also, although wide area networks have been implied, teachings from this specification may be applied to local area networks and personal area networks. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It is further understood that the use of relational terms such as "first" and "second", "top" and "bottom", and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as "one or more" unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

As understood by those in the art, a mobile device includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Moreover, it will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method in a wireless terminal comprising:
    determining a first power value for a first set of time periods of a subcarrier frequency based on at least one first transmission power control parameter;
    determining a second power value for a second set of time periods of the subcarrier frequency based on at least one second transmission power control parameter;
    determining whether a particular time period belongs to the first set of time periods or the second set of time periods;
    if the particular time period belongs to the first set of time periods, transmitting on the subcarrier frequency in the particular time period with a transmission power based on the first power value; and
    if the particular time period belongs to the second set of time periods, transmitting on the subcarrier frequency in the particular time period with a transmission power based on the second power value.

2. The method of claim 1 wherein the first set of time periods and the second set of time periods are non-overlapping in time.

3. The method of claim 1 wherein the first set of time periods and the second set of time periods are partially overlapping in time.

4. The method of claim 1 wherein the first set of time periods corresponds to use of a first RAT and the second set of time periods corresponds to use of a second RAT.

5. The method of claim 1 further comprising:
    transmitting on the subcarrier frequency in the particular time period using a first component carrier wherein the first power value and the second power value correspond to the first component carrier.

6. The method of claim 1 further comprising:
    receiving the at least one first transmission power control parameter and the at least one second transmission power control parameter from a serving base station.

7. The method of claim 6 wherein the at least one second transmission power control parameter includes at least a power offset value and wherein the determining a second power value comprises:
    using the power offset value and the at least one first transmission power control parameter to determine the second power value.

8. The method of claim 7, wherein the power offset value is one or more of:
    a transmission power offset value, an offset value to an uplink power control parameter, and a Maximum Power Reduction (MPR) offset value.

9. The method of claim 1, wherein the at least one first transmission power control parameter includes a first Maximum Power Reduction (MPR) and the at least one second transmission power control parameter includes a second Maximum Power Reduction (MPR).

10. The method of claim 1 wherein transmitting comprises:
    transmitting one or more of a physical uplink shared channel, a physical uplink control channel, a sounding reference signal, or a demodulation reference signal.

11. The method of claim 1 wherein determining the first power value comprises:
    determining the first power value based on $$P_{PUSCH,loop1}(n) = \min\left\{ \begin{array}{l} P_{CMAX}(n), \\ 10\log_{10}(M_{PUSCH}(n)) + P_{O\_PUSCH,loop1} + \\ \alpha_{loop1} \cdot PL + \Delta_{TF,loop1}(i) + f_{loop1}(i) \end{array} \right\}$$

wherein
    $P_{CMAX}(n)$ is a configured maximum transmit power applicable to subframe n,
    $M_{PUSCH}(n)$ is a bandwidth of a transmission in subframe n,
    $P_{O\_PUSCH,\ loop\ 1}$ is an open loop power offset value configured by higher layers,
    $\alpha_{loop\ 1}$ is a fractional power control coefficient configured by higher layers,
    PL is a path loss value associated with a wireless link between the wireless terminal and its serving base station,
    $\Delta_{TF,\ loop\ 1}(i)$ is a power control delta, and
    $f_{loop\ 1}(i)$ is a power adjustment term,
wherein i is a number of subframes over which power offsets derived from transmit power control (TPC) commands were accumulated and wherein the at least one first transmission power control parameter includes at least $P_{O\_PUSCH,\ loop\ 1}$, $\alpha_{loop\ 1}$ and $\Delta_{TF,\ loop\ 1}(i)$.

12. A method of claim 1 further comprising:
    determining a first power headroom report associated with the transmitting based on the first power value if the particular time period belongs to the first set of time periods;
    determining a second power headroom report associated with the transmitting based on the second power value if the particular time period belongs to the second set of time periods; and
    transmitting at least one power headroom report to a serving base station of the wireless terminal.

13. A method in a wireless terminal comprising:
    determining a first power value for a first set of time periods of a subcarrier frequency based on at least one first transmission power control parameter;
    determining a second power value for a second set of time periods of the subcarrier frequency based on at least one second transmission power control parameter;
    if a transmission over a particular time period is based on the first power value, determining a first power headroom report associated with the transmission;
    if the transmission over the particular time period is based on the second power value, determining a second power headroom report associated with the transmission; and
    transmitting at least one power headroom report to a serving base station of the wireless terminal.

14. The method of claim 13 wherein the first set of time periods and the second set of time periods are non-overlapping in time.

15. The method of claim 13 wherein the first set of time periods and the second set of time periods are partially overlapping in time.

16. The method of claim 13 further comprising:
receiving the at least one first transmission power control parameter and the at least one second transmission power control parameter from a base station.

17. The method of claim 16 wherein the at least one second transmission power control parameter includes at least a power offset value and wherein the determining a second power value comprises:
using the power offset value and the at least one first transmission power control parameter to determine the second power value.

18. The method of claim 17, wherein the power offset value is one or more of a transmission power offset value, an offset value to $P_{O\_PUSCH}$, an offset of a $P_{O\_PUSCH}$ component, PL offset, $\Delta_{TF}$ offset, or a Maximum Power Reduction (MPR) offset value.

19. The method of claim 13 wherein the transmitting at least one power headroom report comprises:
transmitting the at least one power headroom report applicable to a first component carrier wherein the first power value and the second power value correspond to the first component carrier.

20. The method of claim 13, wherein
the at least one first transmission power control parameter includes one or more of: a first $P_{O\_PUSCH}$, a first $P_{O\_PUSCH}$ component, a first offset to PL, a first $\Delta_{TF}$, or a first Maximum Power Reduction (MPR); and
the at least one second transmission power control parameter includes one or more of: a second $P_{O\_PUSCH}$, a second $P_{O\_PUSCH}$ component, a second offset to PL, a second $\Delta_{TF}$, or a second Maximum Power Reduction (MPR).

21. The method of claim 13, wherein the transmitting comprises:
transmitting one or more of a physical uplink shared channel, a physical uplink control channel, a sounding reference signal, or a demodulation reference signal.

22. The method of claim 13, wherein determining the first power value comprises:
determining the first power value based on $$PH_{loop\ 1}(n) = P_{CMAX}(n) - \{10 \log_{10}(M_{PUSCH}(n)) + P_{O\_PUSCH, loop\ 1} + \alpha_{loop\ 1} \cdot PL + \Delta_{TF, loop\ 1}(i) + f_{loop\ 1}(i)\}$$

wherein
$PH_{loop\ 1}(n)$ is the first power value,
$P_{CMAX}(n)$ is a configured maximum transmit power applicable to subframe n,
$M_{PUSCH}(n)$ is a bandwidth of the transmission in subframe n,
$P_{O\_PUSCH,\ loop\ 1}$ is an open loop power offset value configured by higher layers,
$\alpha_{loop\ 1}$ is a fractional power control coefficient configured by higher layers,
PL is a path loss value associated with a wireless link between the wireless terminal and its serving base station,
$\Delta_{TF,\ loop\ 1}(i)$ is a power control delta, and
$f_{loop\ 1}(i)$ is a power adjustment term,
wherein i is a number of subframes over which power offsets derived from transmit power control (TPC) commands were accumulated and wherein the at least one first transmission power control parameter includes at least $P_{O\_PUSCH,\ loop\ 1}$, $\alpha_{loop\ 1}$ and $\Delta_{TF,\ loop\ 1}(i)$.

23. The method of claim 13 wherein the transmitting comprises:
receiving a power headroom report transmission instruction from the serving base station; and transmitting the at least one power headroom report in compliance with the power headroom report transmission instruction.

* * * * *